(12) United States Patent
Weil et al.

(10) Patent No.: US 10,038,657 B2
(45) Date of Patent: Jul. 31, 2018

(54) UNSCRIPTED DIGITAL MEDIA MESSAGE GENERATION

(71) Applicant: NightLight Systems LLC, Wilmington, DE (US)

(72) Inventors: Joseph Weil, Novato, CA (US);
Andrew Jarecki, New York, NY (US);
William Joseph Martinez, San Francisco, CA (US)

(73) Assignee: NightLight Systems LLC, Wilmington, DE (US)

(*) Notice: Subject to any disclaimer, the term of this patent is extended or adjusted under 35 U.S.C. 154(b) by 196 days.

(21) Appl. No.: 14/684,054

(22) Filed: Apr. 10, 2015

(65) Prior Publication Data

US 2016/0048306 A1    Feb. 18, 2016

Related U.S. Application Data

(63) Continuation-in-part of application No. 14/683,779, filed on Apr. 10, 2015, which is a continuation-in-part of application No. 14/569,169, filed on Dec. 12, 2014.
(Continued)

(51) Int. Cl.
*G06F 3/048* (2013.01)
*H04L 12/58* (2006.01)
*G06F 3/16* (2006.01)

(52) U.S. Cl.
CPC .............. *H04L 51/10* (2013.01); *G06F 3/167* (2013.01); *G06F 3/048* (2013.01)

(58) Field of Classification Search
CPC ................... H04N 5/265–5/272; H04N 21/854
See application file for complete search history.

(56) References Cited

U.S. PATENT DOCUMENTS 6,262,724 B1   7/2001   Crow et al.
6,624,826 B1   9/2003   Balabanovic
(Continued)

FOREIGN PATENT DOCUMENTS

WO    2011/098925 A1   8/2011
WO    WO2014100893      7/2014

OTHER PUBLICATIONS

PCT Search Report and Written Opinion dated Sep. 16, 2015 for PCT Application No. PCT/US15/38523, 18 pages.
(Continued)

*Primary Examiner* — Claudia Dragoescu
(74) *Attorney, Agent, or Firm* — Invoke

(57) ABSTRACT

A method of generating a digital media message includes receiving a digital video segment providing a plurality of images via a display of the electronic device, each image of the plurality of images being indicative of a respective digital content segment, and receiving, via the electronic device, a first input indicating selection of a first digital content segment associated with a corresponding image of the plurality of images. The method also includes associating the digital video segment and the first digital content segment with a play sequence of the digital media message such that the first digital content segment will be presented simultaneously with at least part of the digital video segment when the digital media message is played. The method further includes providing the digital media message for sharing with a remote electronic device, wherein the digital media message comprises at least the digital video segment and the first, digital content segment.

24 Claims, 13 Drawing Sheets

Related U.S. Application Data

(60) Provisional application No. 62/042,114, filed on Aug. 26, 2014, provisional application No. 62/038,493, filed on Aug. 18, 2014.

(56) References Cited

U.S. PATENT DOCUMENTS

| | | | |
|---|---|---|---|
| 7,209,167 | B2 | 4/2007 | Pyle et al. |
| 7,353,282 | B2 | 4/2008 | Nichols et al. |
| D597,101 | S | 7/2009 | Chaudhri et al. |
| D621,849 | S | 8/2010 | Anzures et al. |
| D626,138 | S | 10/2010 | McLaughlin et al. |
| 7,873,911 | B2 | 1/2011 | Gopalakrishnan |
| 8,290,777 | B1 | 10/2012 | Nguyen et al. |
| 8,428,453 | B1 | 4/2013 | Spiegel et al. |
| D701,526 | S | 3/2014 | Poston et al. |
| D701,533 | S | 3/2014 | Jin et al. |
| D704,205 | S | 5/2014 | Greisson et al. |
| 8,737,815 | B2 | 5/2014 | Singer |
| D727,931 | S | 4/2015 | Kim et al. |
| D728,590 | S | 5/2015 | Kim et al. |
| 9,323,733 | B1 | 4/2016 | McGhee et al. |
| 2003/0063130 | A1 | 4/2003 | Barbieri et al. |
| 2003/0167264 | A1 | 9/2003 | Ogura et al. |
| 2004/0070608 | A1* | 4/2004 | Saka ............... H04L 29/06 715/748 |
| 2004/0075663 | A1 | 4/2004 | Plante |
| 2006/0139340 | A1 | 6/2006 | Geaghan |
| 2008/0229204 | A1 | 9/2008 | Johnson et al. |
| 2009/0013001 | A1 | 1/2009 | Park et al. |
| 2009/0100068 | A1 | 4/2009 | Gauba et al. |
| 2009/0263044 | A1 | 10/2009 | Imagawa et al. |
| 2009/0327856 | A1* | 12/2009 | Mouilleseaux ... G06F 17/30781 715/230 |
| 2010/0064239 | A1 | 3/2010 | Crawford et al. |
| 2010/0077289 | A1 | 3/2010 | Das et al. |
| 2010/0095240 | A1 | 4/2010 | Shiplacoff et al. |
| 2011/0086616 | A1 | 4/2011 | Brand et al. |
| 2011/0163969 | A1 | 7/2011 | Anzures et al. |
| 2011/0229111 | A1 | 9/2011 | Bonarrigo et al. |
| 2011/0258547 | A1 | 10/2011 | Symons et al. |
| 2011/0264755 | A1 | 10/2011 | Salvatore De Villiers |
| 2012/0005595 | A1* | 1/2012 | Gavade ............. G11B 27/034 715/751 |
| 2012/0066594 | A1* | 3/2012 | Gavade ............. H04N 21/2743 715/716 |
| 2012/0151346 | A1 | 6/2012 | McClements, IV |
| 2012/0284094 | A1 | 11/2012 | de Leon et al. |
| 2012/0308209 | A1* | 12/2012 | Zaletel ............. G11B 27/034 386/278 |
| 2013/0034341 | A1 | 2/2013 | Ichikawa et al. |
| 2013/0055087 | A1* | 2/2013 | Flint ................. G11B 27/034 715/723 |
| 2013/0132904 | A1 | 5/2013 | Primiani et al. |
| 2013/0173727 | A1 | 7/2013 | Libin et al. |
| 2013/0212521 | A1 | 8/2013 | Fedoseyeva et al. |
| 2013/0282514 | A1 | 10/2013 | Dougherty et al. |
| 2013/0294746 | A1 | 11/2013 | Oz et al. |
| 2014/0007257 | A1* | 1/2014 | Dougherty ............ G09B 5/062 726/28 |
| 2014/0055633 | A1 | 2/2014 | Marlin et al. |
| 2014/0100893 | A1 | 4/2014 | Zizzi |
| 2014/0108928 | A1 | 4/2014 | Mumick |
| 2014/0147095 | A1 | 5/2014 | Oz et al. |
| 2014/0163957 | A1 | 6/2014 | Tesch et al. |
| 2014/0163980 | A1 | 6/2014 | Tesch et al. |
| 2014/0310748 | A1 | 10/2014 | Dureau et al. |
| 2015/0092006 | A1 | 4/2015 | Grossman et al. |
| 2015/0382056 | A1 | 12/2015 | Burton et al. |
| 2016/0048306 | A1 | 2/2016 | Weil et al. |
| 2016/0048313 | A1 | 2/2016 | Weil et al. |
| 2016/0048373 | A1 | 2/2016 | Weil et al. |
| 2016/0050172 | A1 | 2/2016 | Weil et al. |
| 2016/0203112 | A1 | 7/2016 | Asamani et al. |
| 2016/0205431 | A1 | 7/2016 | Avedissian et al. |
| 2016/0226806 | A1 | 8/2016 | Weil et al. |

OTHER PUBLICATIONS

PCT Search Report and Written Opinion dated Sep. 29, 2015 for PCT Application No. PCT/US15/38557, 9 pages.

PCT Search Report and Written Opinion dated Sep. 30, 2015 for PCT Application No. PCT/US15/38578, 9 pages.

Wochit, "How it Works: Details on our Video Creation Platform," retrieved Nov. 25, 2015 at <<https://www.wochit.com/how-it-works/>>, Wochit Inc., 2015.

Nguyen, N., "Stop, Collaborate, and Remix: Meet MixBit, an Mobile Video Editor", retrieved on Apr. 8, 2016 at <<http://www.popsugar.com/tech/MixBit-Video-App-31107598>>, 2016, 5 pages.

Office action for U.S. Appl. No. 29/523,571, dated Apr. 22, 2016, Weil et al., "A Display Screen or Thereof Having a Graphical User Interface", 7 pages.

"Video Editor 8.1 brings video editing with awesome video effects to windows phone", retrieved on Apr. 8, 2016 at <<http://mspoweruser.com/video-editor-8-1-brings-video-editing-with-awesome-video-effects-to-windows-phone/>>, 2016, 2 pages.

Pizano et al., "Integrated multimedia messaging concepts and applications", Proceedings of the 1996 ACM symposium on Applied Computing SAC '96, 1996, pp. 12-16.

Decneut et al., "Targeting heterogeneous multimedia environments with Web services", Proceedings of IEEE International Conference on Web Services, 2004, pp. 682-689.

\* cited by examiner

UNSCRIPTED DIGITAL MEDIA MESSAGE GENERATION

CROSS-REFERENCE TO RELATED APPLICATIONS

This application is a continuation-in-part of U.S. application Ser. No. 14/683,779, filed Apr. 10, 2015, which is a continuation-in-part of U.S. application Ser. No. 14/569,169, filed Dec. 12, 2014, which claims the benefit of U.S. Provisional Application No. 62/042,114, filed Aug. 26, 2014, and U.S. Provisional Application No. 62/038,493, filed Aug. 18, 2014. The entire disclosures of each of the above applications are incorporated herein by reference.

BACKGROUND

It is common for users of electronic devices to communicate with other remote users by voice, email, text messaging instant messaging, and the like. While these means of electronic communication may be convenient in various situations, such means are only suited for transferring a limited amount of content between users. For instance, while text messages and email may be used to transmit written dialogue between users, and audio, video, web content, or other files may be transmitted with the text or email messages as attachments, such files are not integrated with the various components of the text or email message in any way.

As a result, electronic device messaging applications have been developed to assist the user in creating digital messages that include, for example, images, audio, or other content. However, the functionality of existing messaging applications is limited. For example, such applications do not enable the user to combine a wide array of digital content segments (e.g., a digital video segment and a digital image) such that portions of two or more content segments, including content segments from different sources, can be presented to the recipient simultaneously as an integrated component of the digital message. Additionally, such applications do not provide the user with the ability to easily edit the digital message during creation. Further, while a variety of different audio and/or video editing software is available, such software is far too cumbersome for use on mobile phones or other like electronic devices. Such video editing software is also complicated and time consuming, and as a result, is not suitable for use in creating digital messages as a means of communication between electronic device users.

For example, in order to enable conversational communication between users, digital messages must be created within a relatively narrow creation window (i.e., relatively quickly). In some situations, a one-minute creation window may be at the high end of the spectrum. However, existing audio and/or video editing software that enables combining media into a single shareable file operates at a "project building" pace, often requiring dozens of steps and falling outside of the narrow creation window that typical conversational communication requires. As a result, electronic device messaging applications have defaulted to only sharing media items as disparate elements "attached to" but not integrated or woven into the digital message.

Example embodiments of the present disclosure are directed toward curing one or more of the deficiencies described above.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
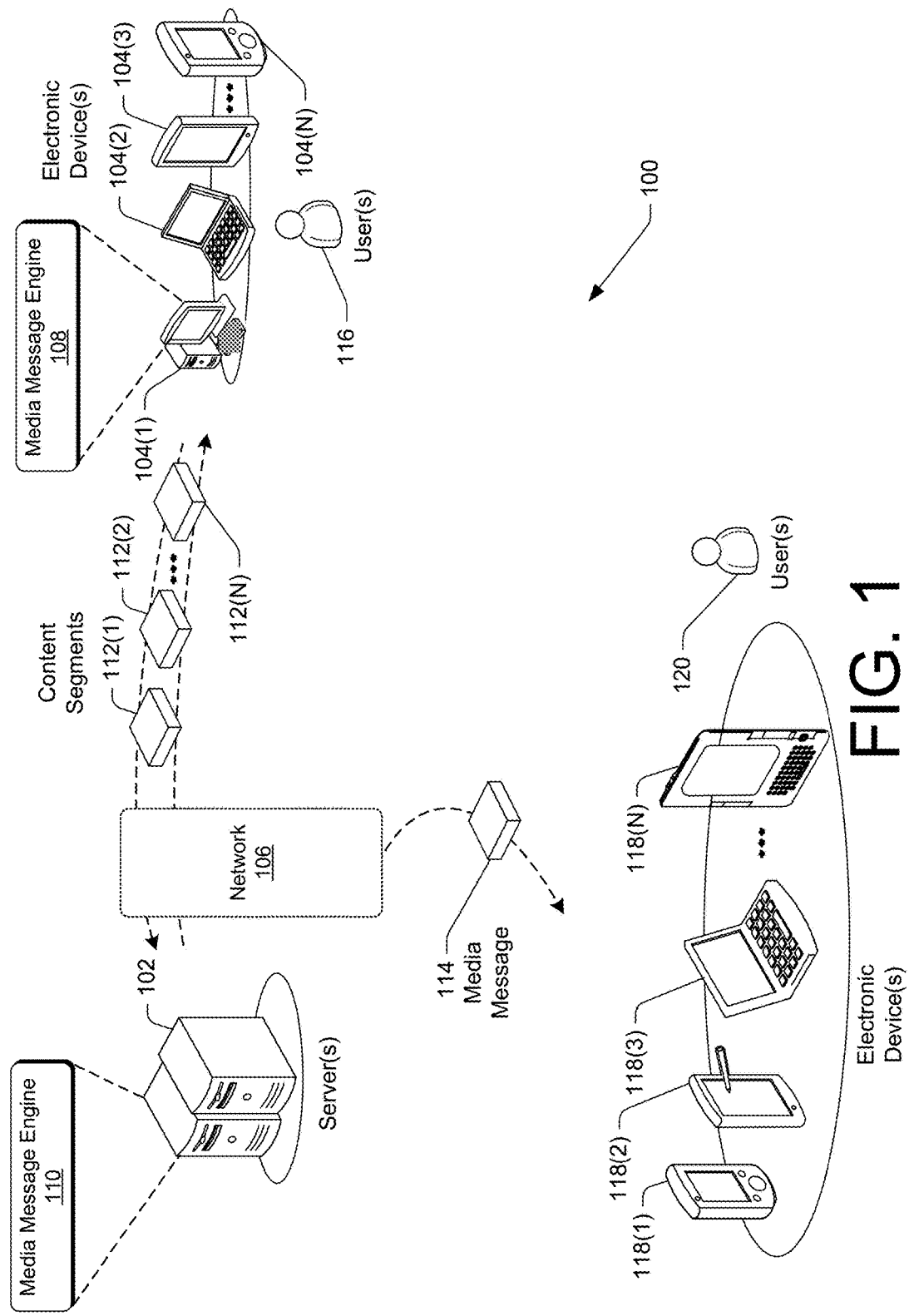
FIG. 1 is a schematic diagram of an illustrative computing environment for implementing various embodiments of digital media message generation.

The disclosure is directed to devices and techniques for generating digital media messages that can be easily shared between users of electronic devices as a means of communication. The techniques described herein enable users to combine a variety of different digital content segments into a single digital media message. For example, the user may create a digital media message by capturing audio content segments, video content segments, digital images, web content, and the like. Such content segments may be captured by the user during generation of the digital media message. Alternatively, such content segments may be captured by the user prior to generating the digital media message, and may be saved in a memory of the electronic device or in a memory separate from the device (e.g., on a server accessible via a network, etc.) for incorporation into the digital media message at a later time. As part of generating the digital media message, the user may select one or more of the digital content segments for incorporation into the message and may associate the selected content segments with respective positions in a play sequence of the digital media message.

In some examples, the user may select one or more digital content segments to be presented simultaneously with audio or other portions of a digital video segment when the digital media message is played by a recipient of the digital media message on a remote device. In such examples, the underlying digital video segment may comprise the main or primary content on which the digital media message is based, and the various selected digital content segments may comprise additional or supplemental content that may be incorporated into the digital media message as desired. For example, the underlying digital video segment may have an elapsed time, length or duration that defines the elapsed time of the resulting digital media message. The digital video segment may also include and/or may be segmented into separate tracks or sections, such as an audio track and a video track. In example embodiments, at least part of one or more such tracks of the digital video segment may be supplemented, augmented, overwritten, and/or replaced by selected digital content segments during formation of the digital media message. For example, a digital image of a selected digital content segment may replace at least part of the video track of the underlying digital video segment. As a result, the digital image of the selected digital content segment may be presented simultaneously with a portion of the audio track of the digital video segment corresponding to the replaced portion of the video track. The user may also edit or revise the digital video segment, the digital content segments, or various other portions of the digital media message while the message is being generated.

Replacing, for example, part of the video track of the underlying digital video segment with the digital image may reduce the file size of the digital video segment and/or of a combined segment formed by combining the digital image with the digital video segment. In particular, the replaced portion of the video track typically would typically be rendered at approximately 300 frames/second for a duration of the portion of the video track, and would be characterized by a commensurate memory and/or file size (e.g., in bytes). The selected digital image, on the other hand, comprises a single frame that will be rendered for the duration of the replaced portion of the video track. Thus, replacing a portion of the video track of the underlying digital video segment with the digital image reduces the number of frames/second of the underlying video segment, thereby reducing file size thereof. As a result, a digital media message generated using such techniques will have a smaller file size and will require/take up less memory than a corresponding digital media message generated using the underlying digital video segment with the video track unchanged (e.g., without replacing a portion of the video track with a selected digital image).

Reducing the file size and/or memory requirements of digital media messages in this way has many technical effects and/or advantages. For example, such a reduction in file size and/or memory requirements will enable the various networks, servers, and/or electronic devices described herein to transfer such digital media messages more quickly and with fewer network, server, and/or device resources. As a result, such a reduction in file size and/or memory requirements will reduce overall network load/traffic, and will improve network, server, and/or electronic device performance. As another example, such a reduction in file size and/or memory requirements will enable the various networks, servers, and/or electronic devices described herein to provide, render, display, and/or otherwise process such digital media messages more quickly and with fewer network, server, and/or device resources. In particular, such a reduced file size may reduce the server and/or electronic device memory required to receive and/or store such messages. Such a reduced file size may also reduce the processor load required to provide, render, display, and/or otherwise process such digital media messages. As a result, such a reduction in file size and/or memory requirements will reduce overall network load/traffic, and will improve network, server, and/or electronic device performance and efficiency.

In various embodiments, the devices and techniques described herein may enable users of electronic devices to communicate by transmitting digital media messages that include a rich, unique, and artful combination of digital video segments and/or other digital content segments. Such content segments may be combined in response to, for example, a series of simple touch gestures received from a user of the electronic device. Methods of generating such digital media messages may be far simpler and less time consuming than using, for example, known audio and/or video editing software. Additionally, methods of generating such digital media messages may enable users to combine and present multiple content segments in ways that are not possible using existing messaging applications. Example methods of the present disclosure may also enable the user to edit or revise such digital media messages during creation with relative ease and simplicity.

Illustrative environments, devices, and techniques for generating digital media messages are described below. However, the described message generation techniques may be implemented in other environments and by other devices or techniques, and this disclosure should not interpreted as being limited to the example environments, devices, and techniques described herein.

Illustrative Architecture

FIG. 1 is a schematic diagram of an illustrative computing environment 100 for implementing various embodiments of unscripted digital media message generation. The computing environment 100 may include server(s) 102 and one or more electronic devices 104(1)-104(N) (collectively "electronic devices 104") that are communicatively connected by a network 106. The network 106 may be a local area network ("LAN"), a larger network such as a wide area network ("WAN"), or a collection of networks, such as the Internet. Protocols for network communication, such as TCP/IP, may be used to implement the network 106. Although embodiments are described herein as using a network such as the Internet, other distribution techniques may be implemented that transmit information via memory cards, flash memory, or other portable memory devices.

A media message engine 108 on the electronic devices 104 and/or a media message engine 110 on the server(s) 102 may receive one or more digital video segments, digital audio segments, digital images, and/or other digital content segments 112(1)-112(N) (collectively, "digital content segments 112" or "content segments 112") and may generate one or more digital media messages 114 (or "media messages 114") using one or more parts of at least one of the content segments 112. In example embodiments, the media message engine 108 may receive one or more content segments 112 via interaction of a user 116 with an electronic device 104. In some embodiments, the media message engine 108 may provide such content segments 112 to the media message engine 110 on the server 102, via the network 106, to generate at least a portion of the media message 114. Alternatively, at least a portion of the media message 114 may be generated by the media message engine 108 of the respective electronic device 108. In either example, the media message 114 may be directed to one or more additional electronic devices 118(1)-118(N) (collectively "electronic devices 118") via the network 106. Such electronic devices 118 may be disposed at a location remote from the electronic devices 104, and one or more users 120 may consume the digital media message 114 via one or more of the electronic devices 118.

Each of the electronic devices 104 may include a display component, a digital camera configured to capture still photos, images, and/or digital video, and an audio input and transmission component. Such audio input and transmission components may include one or more microphones. In some examples, the digital camera may include a video sensors, light sensors, and/or other video input components configured to capture and/or form a video track of a digital content segment 112 and one or more audio sensors, microphones, and/or other audio input and transmission components configured to capture and/or form a corresponding audio track of the same digital content segment 112. The electronic devices 104 may also include hardware and/or software that support voice over Internet Protocol (VoIP) as well as any of the display, input, and/or output components described herein. Each of the electronic devices 104 may further include a web browser that enables the user 116 to navigate to a web page via the network 106. In some embodiments, the user 116 may generate and/or capture one or more digital content segments 112 using, for example, the camera and the microphone. For example, the user 116 may capture one or more digital images using the camera and/or may capture one or more digital video segments using the camera in conjunction with the microphone. Additionally, each web page may present content that the user 116 may capture via the electronic device 104, using various copy and/or save commands included in the web browser of the electronic device 104, and the user may incorporate such content into one or more content segments 112. Any of the content segments 112 described herein may be provided to one or both of the media message engines 108, 110, and the media message engines 108, 110 may incorporate such content segments 112, and/or portions thereof, into the media message 114.

Upon receiving the content segments 112 described herein, the media message engines 108, 110 may tag the respective content segments 112 with associated metadata. The associated metadata may include profile information about the type of content (e.g., image, video, audio, text, animation, etc.), the source of the content segment 112 (e.g., camera, microphone, internet web page, etc.), and/or a position or location in a play sequence of the digital media message 114 with which the content segment 112 is to be associated.

The media message engines 108, 110 described herein may integrate and/or otherwise combine two or more content segments 112 to form the digital media message 114. In some examples, the content segments 112 may be presented to the user sequentially when the media message 114 is played. Alternatively, the media message engines 108, 110 may combine at least part of two or more content segments 112 such that, for example, at least part of a first content segment 112 is presented simultaneously with at least part of a second content segment 112 when the media message 114 is played. For example, a first digital content segment 112(1) comprising a digital photo or image may be combined with audio from at least part of a second digital content segment 112(2) comprising a digital video segment. As a result, the audio from the second digital content segment 112(2) may be presented simultaneously with the photo or image from the first digital content segment 112(1) when the resulting digital media message 114 is played. In such examples, the second digital content segment 112(2) (e.g., the digital video segment) may comprise an underlying digital content segment forming the basis and/or background of the digital media message 114. In such examples, one or more additional digital content segments (e.g., digital images, audio, etc.) may be combined with the second digital content segment 112(2) when the digital media message 114 is formed. During this process, the additional digital content segments may replace corresponding portions of the second digital content segment 112(2). For example, a digital image of the first digital content segment 112(1) may replace a corresponding video portion and/or image of the second digital content segment 112(2) when the first digital content segment 112(1) is combined with the particular portion of the second digital content segment 112(2). As a result, audio of the particular portion of the second digital content segment 112(2) may be presented simultaneously with the digital image of the first digital content segment 112(1) when the resulting digital media message 114 is played. The media message engines 108, 110 may also distribute the finalized media message 114 to one or more of the electronic devices 118. Various example components and functionality of the media message engines 108, 110 will be described in greater detail below with respect to, for example, FIGS. 2 and 3.

In any of the example embodiments described herein, replacing, for example, a portion of a second digital content segment 112(2) (e.g., at least a portion of a video track of a digital video segment) with a first digital content segment 112(1) (e.g., a digital image) may reduce the file size and/or memory requirements of the second digital content segment 112(2) and/or of a combined segment formed by combining the second digital content segment 112(2) with the first digital content segment 112(1). In any of the examples described herein, a digital video segment of the second digital content segment 112(2) may comprise, among other things, a video track, and a corresponding separate audio track. In some examples, a replaced portion of a video track of the second digital content segment 112(2) may be rendered at approximately 300 frames/second for a duration of the portion of the video track, and would be characterized by a commensurate memory and/or file size (e.g., in bytes). The digital image of the first digital content segment 112(1), on the other hand, may comprise a single frame that will be rendered for the duration of the replaced portion of the video track. Thus, replacing a portion of the video track of the second digital content segment 112(2) with the digital image of the first digital content segment 112(1) may reduce the number of frames/second of the combined segment, thereby reducing the file size thereof relative to the unaltered second digital content segment 112(2). As a result, a digital media message 114 generated using such techniques will have a smaller file size and will require/take up less memory than a corresponding digital media message generated using the second digital content segment 112(2) with the video track unchanged (e.g., without replacing a portion of the video track with a selected digital image).

Reducing the file size and/or memory requirements of digital media messages 114 in this way has many technical effects and/or advantages. For example, such a reduction in file size and/or memory requirements will enable the various networks 106, servers 102, and/or electronic devices 104, 118 described herein to transfer such digital media messages 114 more quickly and with fewer network, server, and/or device resources. As a result, such a reduction in file size and/or memory requirements will reduce overall network load/traffic, and will improve network, server, and/or electronic device performance. As another example, such a reduction in file size and/or memory requirements will enable the various networks 106, servers 102, and/or electronic devices 104, 118 described herein to provide, render, display, and/or otherwise process such digital media messages 114 more quickly and with fewer network, server, and/or device resources. In particular, such a reduced file size may reduce the server and/or electronic device memory required to receive and/or store such messages 114. Such a reduced file size may also reduce the server and/or electronic device processor load required to provide, render, display, and/or otherwise process such digital media messages 114. As a result, such a reduction in file size and/or memory requirements will reduce overall network load/traffic, and will improve network, server, and/or electronic device performance and efficiency.

In various embodiments, the electronic devices 104, 118 may include a mobile phone a portable computer, a tablet computer, an electronic book reader device (an "eBook reader device"), or other devices. Each of the electronic devices 104, 118 may have software and hardware components that enable the display of digital content segments 112, either separately or combined, as well as the various digital media messages 114 described herein. The electronic devices 104, 118 noted above are merely examples, and other electronic devices that are equipped with network communication components, data processing components, electronic displays for displaying data, and audio output capabilities may also be employed.

Example Server

Figure 2:
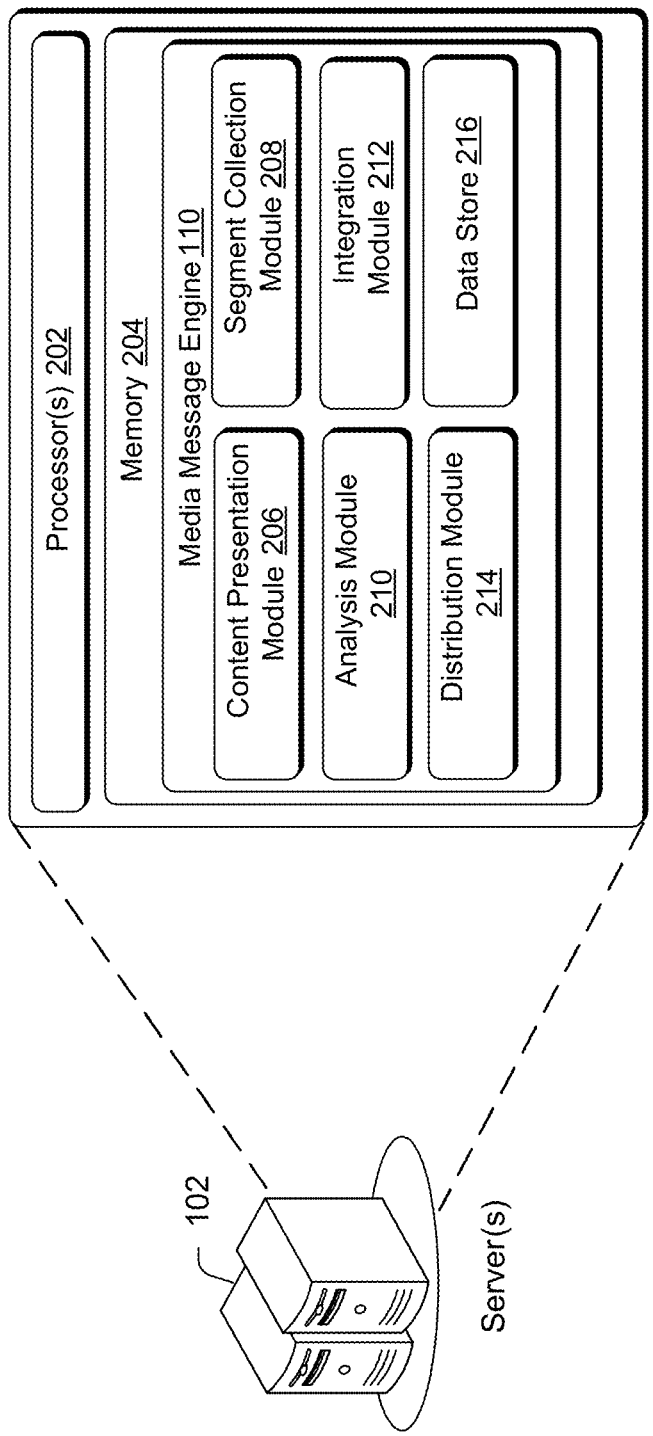
FIG. 2 is a schematic diagram of illustrative components in an example server that may be used in an example digital media message generation environment.

FIG. 2 is a schematic diagram of illustrative components in example server(s) 102 of the present disclosure. The server(s) 102 may include one or more processor(s) 202 and memory 204. The memory 204 may include computer readable media. Computer readable media may include volatile and non-volatile, removable and non-removable media implemented in any method or technology for storage of information such as computer readable instructions, data structures, program modules, or other data. As defined herein, computer readable media does not include communication media in the form of modulated data signals, such as carrier waves, or other transmission mechanisms.

The media message engine 110 may be a hardware or a software component of the server(s) 102 and in some embodiments, the media message engine 110 may comprise a component of the memory 204. As shown in FIG. 2, in some embodiments the media message engine 110 may include one or more of a content presentation module 206, a segment collection module 208, an analysis module 210, an integration module 212, and a distribution module 214. The modules may include routines, programs instructions, objects, and/or data structures that perform particular tasks or implement particular abstract data types. The server(s) 102 may also implement a data store 216 that stores data, digital content segments 112, and/or other information or content used by the media message engine 110.

The content presentation module 206 may enable a human reader to select digital content segments 112 for the purpose of including the selected digital content segments 112 in a digital media message 114. In various embodiments, the content presentation module 206 may present a web page to a user 116 of an electronic device 104, such as via the network 106. In further embodiments, the content presentation module 206 may present digital content, information, and/or one or more digital content segments 112 to the user 116 of an electronic device 104 via the network 106. The content presentation module 206 may also enable the user 116 to select content, information, and/or one or more digital content segments 112. Once the user 116 has selected, for example, a digital content segment 112, the content presentation module 206 may present further content, information, and/or digital content segments 112 to the user 116. The content presentation module 206 may also tag the selected digital content segment 112 for inclusion in the digital media message 114.

The segment collection module 208 may collect audio recordings, video recordings, images, files, web content, audio files, video files, web addresses, and/or other digital content segments 112 identified, selected, and/or captured by the user 116. Additionally, the segment collection module 208 may label each digital content segment 112 with metadata. The metadata may include profile information about the type of content (e.g., image, video, audio, text, animation, etc.), the source of the content segment 112 (e.g., camera, microphone, internet web page, etc.), and/or a position or location in a play sequence of the digital media message 114 with which the content segment 112 is to be associated. For example, the metadata for an audio recording may include identification information identifying the digital content segment 112 as comprising an audio recording, information indicating that the digital content segment 112 was captured using a microphone of an electronic device 104, information indicating the date and time of recordation, the length of the recording, and/or other information. Such metadata may be provided to the content presentation module 206 by the segment collection module 208 or alternatively, such metadata may be provided to the segment collection module 208 by the content presentation module 206.

The analysis module 210 may be used by the segment collection module 208 to determine whether a collected content segment 112 meets certain quality criteria. In various embodiments, the quality criteria may include whether a background noise level in the content segment 112 is below a maximum noise level, whether video and/or image quality in the content segment 112 is above a minimum pixel or other like quality threshold, and so forth.

The integration module 212 may use at least a portion of the metadata described above to assess and/or otherwise determine which content segment 112 to select for integration into the digital media message 114. Additionally or alternatively, the integration module 212 may use results received from the analysis module 210 to make one or more such determinations. Such determinations may be provided to the user 116 of the electronic device 104 while a digital media message 114 is being generated as a way of guiding the user with regard to the combination of one or more content segments 112. For instance, the integration module 212 may provide advice, suggestions, or recommendations to the user 116 as to which content segment 112 to select for integration into the digital media message 114 based on one or more of the factors described above.

The distribution module 214 may facilitate presentation of the digital media message 114 to one or more users 120 of the electronic devices 118. For example, once completed, the distribution module 214 may direct the digital media message 114 to one or more of the electronic devices 118 via the network 106. Additionally or alternatively, the distribution module 214 may be configured to direct one or more digital content segments 112 between the servers 102 and one or more of the electronic devices 104. In such embodiments, the distribution module 214 may comprise one or more kernels, drivers, or other like components configured to provide communication between the servers 102 and one or more of the electronic devices 104, 118.

The data store 216 may store any of the metadata, content, information, or other data utilized in creating one or more content segments 112 and/or digital media messages 114. For example, the data store 216 may store any of the images, video files, audio files, web links, media, or other content that is captured or otherwise received via the electronic device 104. Such content may be, for example, provided to the data store 216 via the network during creation of a content segment 112 and/or a digital media message 114. Alternatively, such content may be provided to the data store 216 prior to generating a content segment 112 and/or a digital media message 114. In such examples, such content may be obtained and/or received from the data store 216 during generation of a content segment 112 and/or a digital media message 114.

In example embodiments, one or more modules of the media message engine 110 described above may be combined or omitted. Additionally, one or more modules of the media message engine 110 may also be included in the media message engine 108 of the electronic device 104. As a result, the example methods and techniques of the present disclosure, such as methods of generating a digital media message 114, may be performed solely on either the server 102 or one of the electronic devices 104. Alternatively, in further embodiments, methods and techniques of the present disclosure may be performed, at least in part, on both the server 102 and one of the electronic devices 104.

Example Electronic Device

Figure 3:
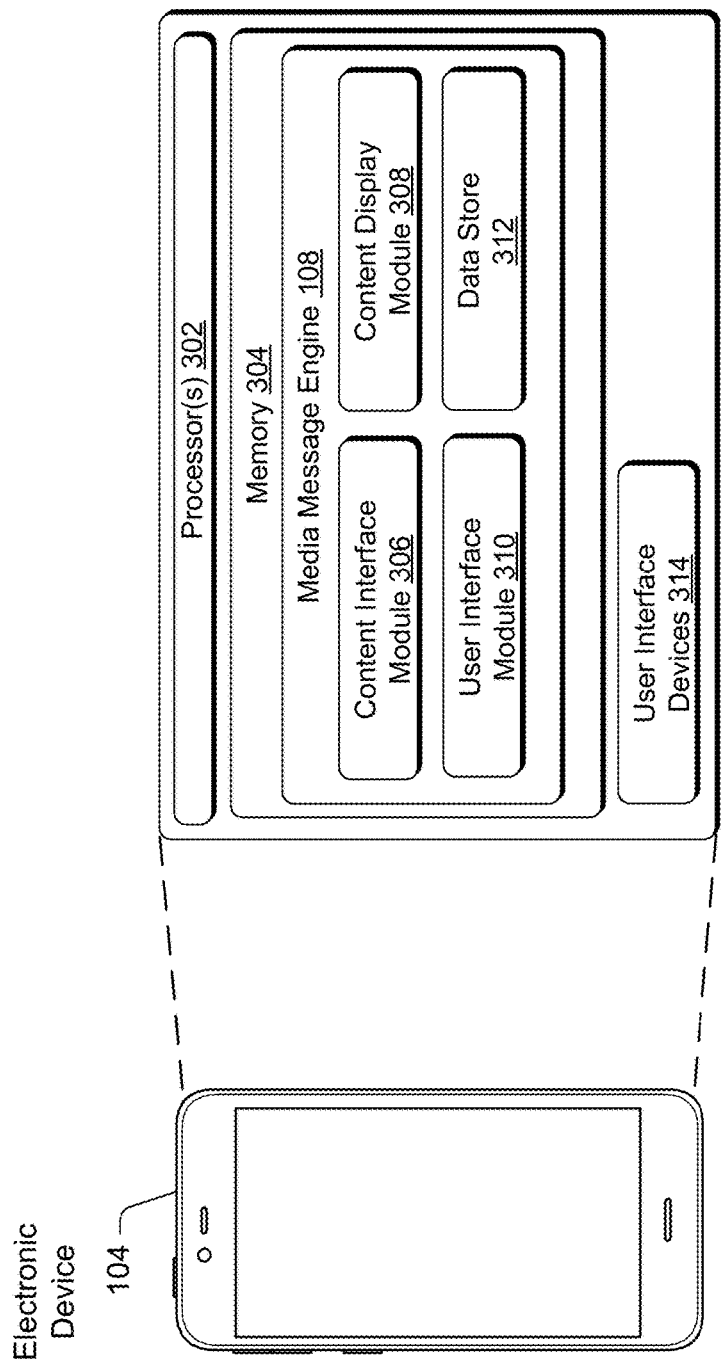
FIG. 3 is a schematic diagram of illustrative components in an example electronic device that may be used in an example digital media message generation environment.

FIG. 3 is a schematic diagram of illustrative components in an example electronic device 104 that is used to prepare and/or consume digital content segments 112 and digital media messages 114. As noted above, the electronic device 104 shown in FIG. 3 may include one or more of the components described above with respect to the server 102 such that digital content segments 112 and/or digital media messages 114 may be created and/or consumed solely on the electronic device 104. Additionally and/or alternatively, the electronic device 104 may include one or more processor(s) 302 and memory 304. The memory 304 may include computer readable media. Computer readable media may include volatile and non-volatile, removable and non-removable media implemented in any method or technology for storage of information such as computer readable instructions, data structures, program modules, or other data. As defined herein, computer readable media does not include communication media in the form of modulated data signals, such as a carrier wave, or other transmission mechanisms.

Similar to the memory 204 of the server 102, the memory 304 of the electronic device 104 may also include a media message engine 108, and the engine 108 may include any of the modules or other components described above with respect to the media message engine 110. Additionally or alternatively, the media message engine 108 of the electronic device 104 may include one or more of a content interface module 306, a content display module 308, a user interface module 310, and a data store 312 similar to the data store 216 described above. The modules may include routines, programs, instructions, objects, and/or data structures that perform particular tasks or implement particular abstract data types. The electronic device 104 may also include one or more cameras, video cameras, microphones, displays (e.g., a touch screen display), keyboards, mice, touch pads, proximity sensors, capacitance sensors, or other user interface devices 314. Such user interface devices 314 may be operably connected to the processor 302 via, for example, the user interface module 310. As a result, input received via one or more of the user interface devices 314 may be processed by the user interface module 310 and/or may be provided to the processor 302 via the user interface module 310 for processing.

The content interface module 306 may enable the user to request and download content, digital content segments 112, or other information from the server(s) 102 and/or from the internet. The content interface module 306 may download such content via any wireless or wired communication interfaces, such as Universal Serial Bus (USB), Ethernet, Bluetooth®, Wi-Fi, and/or the like. Additionally, the content interface module 306 may include and/or enable one or more search engines or other applications on the electronic device 104 to enable the user 116 to search for images, video, audio, and/or other content to be included in a digital media message 114.

The content display module 308 may present content, digital content segments 112, digital media messages 114, or other information on a display of the electronic device 104 for viewing. In various embodiments, the content display module 308 may provide functionalities that enable the user 116 to manipulate individual digital content segments 112 or other information as a digital media message 114 is being generated. For example, the content display module 308 may provide editing functionality enabling the user 116 to delete, move, modify, augment, cut, paste, copy, save, or otherwise alter portions of each digital content segment 112 as part of generating a digital media message 114.

Example User Interfaces

Figure 4:
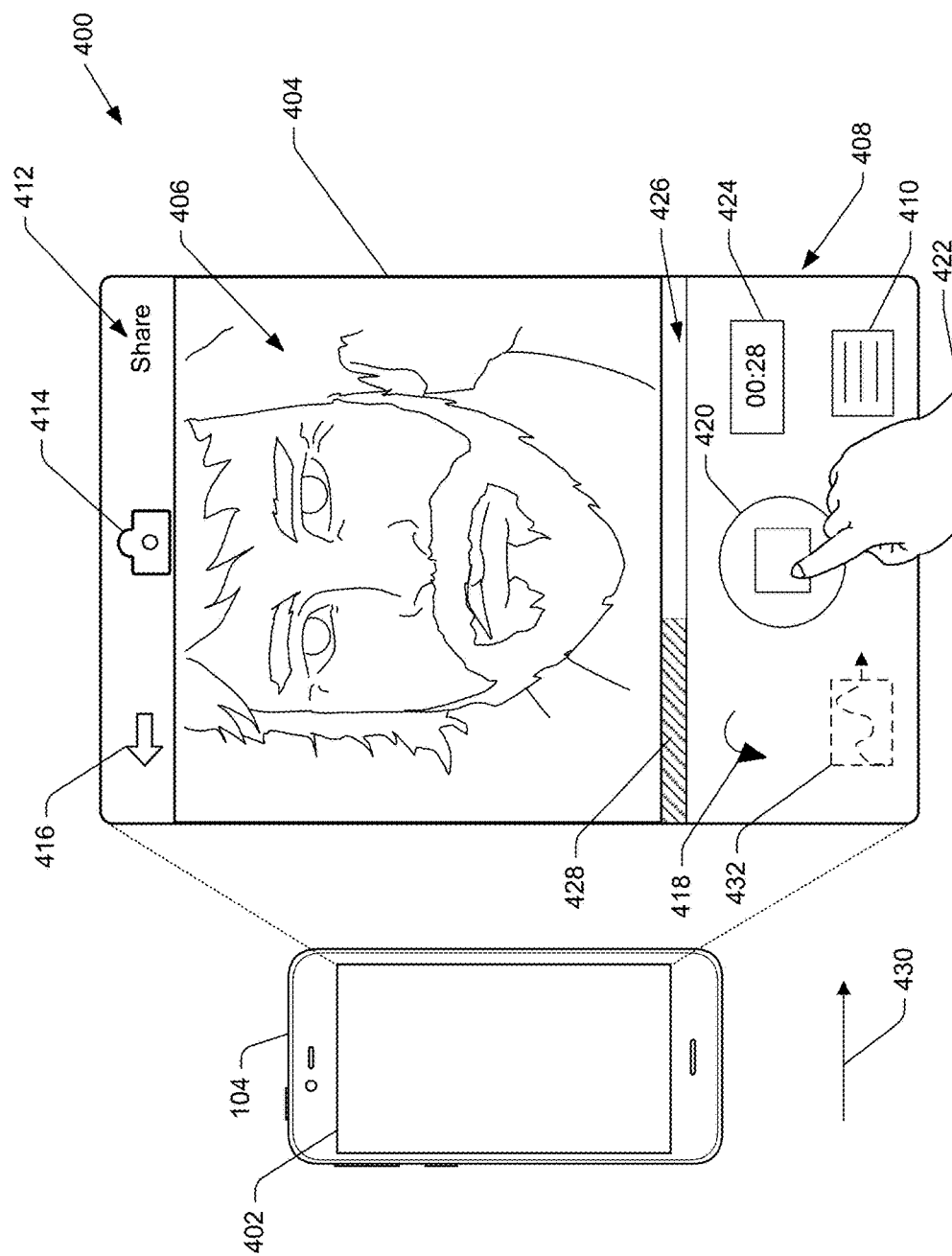
FIG. 4 shows an illustrative user interface screen displayed on an electronic device that enables users to generate a portion of an example digital media message.

FIG. 4 shows an illustrative user interface 400 that enables the user 116 to generate a digital media message 114. For example, the user interface 400 may be displayed on an electronic device 104 that enables users to generate, create, capture, search for, and/or select digital content segments 112, and to generate and/or consume digital media messages 114. As noted above, such digital content segments 112 may comprise digital video segments (including both audio and video portions), digital audio segments, digital photos or images, and/or other types of digital content. The user interface 400 may be displayed, for example, on a display 402 of the electronic device 104. In some examples, the user interface 400 may be a web page that is presented to the user 116 via a web browser on the electronic device 104. Alternatively, the user interface 400 may be an interface generated and provided by the content display module 308 as part of a digital media message generation application operating locally on the electronic device 104. For the duration of this disclosure, example embodiments in which the user interface 400 is generated and provided by the content display module 308 and/or other components of the media message engine 108 as part of a digital media message generation application operating locally on the electronic device 104 will be described unless otherwise noted.

As shown, the media message engine 108 may present a user interface 400 that includes a first portion 404 displaying an image 406, and a second portion 408 that may include one or more controls, images, thumbnails, or other content or devices configured to assist the user 116 in generating a digital media message 114. In example embodiments, the image 406 displayed in the first portion 404 may be one or more images, photos, or first frames of a video segment stored in the memory 304 of the electronic device 104. Alternatively, the content display module 308 may present one or more images 406 in the first portion 404 that are obtained in real time via, for example, a camera or other user interface device 314 of the electronic device 104. For example, the first portion 404 may provide an image 406 of objects that are within a field of view of the camera, and at least the first portion 404 may be receptive to user input such as, for example, touch input.

As will be described in greater detail below, the media message engine 108 may receive input from a user of the electronic device 104 via either the first portion 404 or the second portion 408. In some embodiments, such input may comprise one or more gestures, such as a touch and hold command, received within the first portion 404. Receipt of such an input in the first portion 404 may cause the media message engine 108 to capture and/or otherwise receive a first digital content segment 112 via, for example, the camera or other user interface device 314 of the electronic device 104. In such embodiments, the received digital content segment 112 may be displayed within the first portion 404 as the content segment 112 is being recorded and/or otherwise captured by the camera. The media message engine 108 may also associate the digital content segment 112 with a desired position in a play sequence of a digital media message 114.

Additionally, as will be described in greater detail below, the media message engine 108 may receive input from the user of the electronic device 104 that includes a touch and hold command on one or more thumbnails or other images provided in the second portion 408. Receipt of such an input in the second portion 408 may cause the media message engine 108 to receive an audio segment, a video segment, and/or an image associated with the respective thumbnail or image for inclusion in the digital media message 114. The media message engine 108 may also associate digital content segments 112 corresponding to the selected one or more images or thumbnails with respective desired positions in the play sequence of the digital media message 114.

The various controls of the user interface 400 may be configured to assist the user 116 in capturing one or more digital content segments 112, modifying one or more of the digital content segments 112, and/or generating one or more digital media messages 114. For example, the user interface 400 may include a menu control 410 configured to provide the user 116 with access to, for example, a user profile, different drafts of various digital media messages 114, and/or to photo or video libraries stored in the memory 304. Additionally, the user interface 400 may include a preview and/or share control 412 configured to control the content display module 308 to provide one or more draft digital media messages, or one or more such messages that is in the process of being generated, to the user for viewing via the display 402. The control 412 may also control one or more components of the media message engine 108 to enable sharing of the digital media message 114 being previewed with users 120 of remote electronic devices 118 via one or more components of the media message engine 108. The user interface 400 may further include a user interface device control 414 configured to control one or more operations of a user interface device 314 of the electronic device 104. For example, the user interface device control 414 may be configured to control activation of one or more cameras of the device 104. In particular, the user interface device control 414 may be configured to select and/or toggle between a first camera of the electronic device 104 on a first side of the electronic device 104 (e.g., facing toward the user 116) and a second camera on a second side of the electronic device 104 opposite the first side (e.g., facing away from the user 116).

The user interface 400 may also include a plurality of additional controls including one or more navigation controls 416 and/or one or more editing controls 418. For example, the user interface 400 may include a navigation control 416 that, upon selection thereof by the user 116, may enable the user to browse backward or forward between different user interfaces 400 while generating a digital media message 114. For example, a first navigation control 416 may comprise a "back" control while a second navigation control 416 may comprise a "forward" control.

Additionally, one or more of the editing controls 418 may enable a user 116 to add, remove, cut, paste, draw, rotate, flip, shade, color, fade, darken, and/or otherwise modify various aspects of the digital media message 114 and/or various digital content segments 112. For example, one or more of the editing controls 418 may comprise an "undo" control that enables the user 116 to cancel the last action performed via the user interface 400. In some embodiments, the actuation of the editing control 118 may enable the user 116 to delete and/or otherwise remove one or more digital content segments 112 from a play sequence of the digital media message 114. Although a variety of different controls have been described above with regard to the user interface 400, it is understood that in further example embodiments one or more additional controls may be presented to the user 116 by the media message engine 108. For example, such editing controls 418 may further comprise any audio, video, image, or other editing tools. In some examples, at least one of the controls described herein may be configured to modify a first digital content segment 112 before a second, third, or other additional digital content segment 112 is captured and/or otherwise received by the media message engine 108.

Additionally, the user interface 400 may include a capture control 420 configured to receive one or more touch inputs from the user 116 and to capture one or more digital content segments 112 in response to such input. For example, a finger or other part of a hand 422 of the user 116 may provide a tap, touch, swipe, touch and hold, and/or other type of input via the capture control 420 and/or at other locations on either the first portion 404 or the second portion 408. In response to receiving such input, the capture control 420 may direct one or more signals corresponding to and/or otherwise indicative of such input to the user interface module 310. The user interface module 310 and/or other components of the media message engine 108, either alone or in combination with the processor 302, may direct the camera and/or other user interface device 314 to capture one or more digital content segments 112 in response to such input. Such digital content segments 112 may then be stored automatically in the memory 304 for use in generating one or more digital media messages 114. For example, a first touch input received via the capture control 420 may start a record or capture operation, and a second touch input received via the capture control 420 may stop an ongoing capture operation. In an example embodiment, the user interface 400 may also include a timer 424 configured to provide visual indicia indicative of one or more aspects of the digital content segment 112 and/or of the digital media message 114. For example, the timer 424 may display an elapsed time of a digital content segment 112 that is being captured and/or that is being played via the display 402.

As shown in FIG. 4, an example user interface 400 may also include a progress bar 426. In example embodiments, the progress bar 426 may provide additional visual indicia of, for example, the amount of time elapsed while a digital content segment 112 is being captured and/or while a captured digital content segment 112 is being played. In some embodiments, the progress bar 426 may be disposed between the first portion 404 and the second portion 408 of the user interface 400. In additional examples, on the other hand, the progress bar 426 may be located at any desirable position on the display 402 to facilitate providing information to the user 116.

The progress bar 426 may include one or more portions 428 or other dynamic visual indicia. For example, the progress bar 426 may be provided via the display 402 while a digital video segment, digital audio segment, or other such digital content segment 112 is being captured. In such embodiments, the progress bar 426 may include visual indicia, such as the first portion 428, having a length that changes, in real time, as the digital content segment 112 is being captured. For example, the first portion 428 may move or expand in the direction of arrow 430 as a digital content segment 112 is being recorded.

Figure 8:
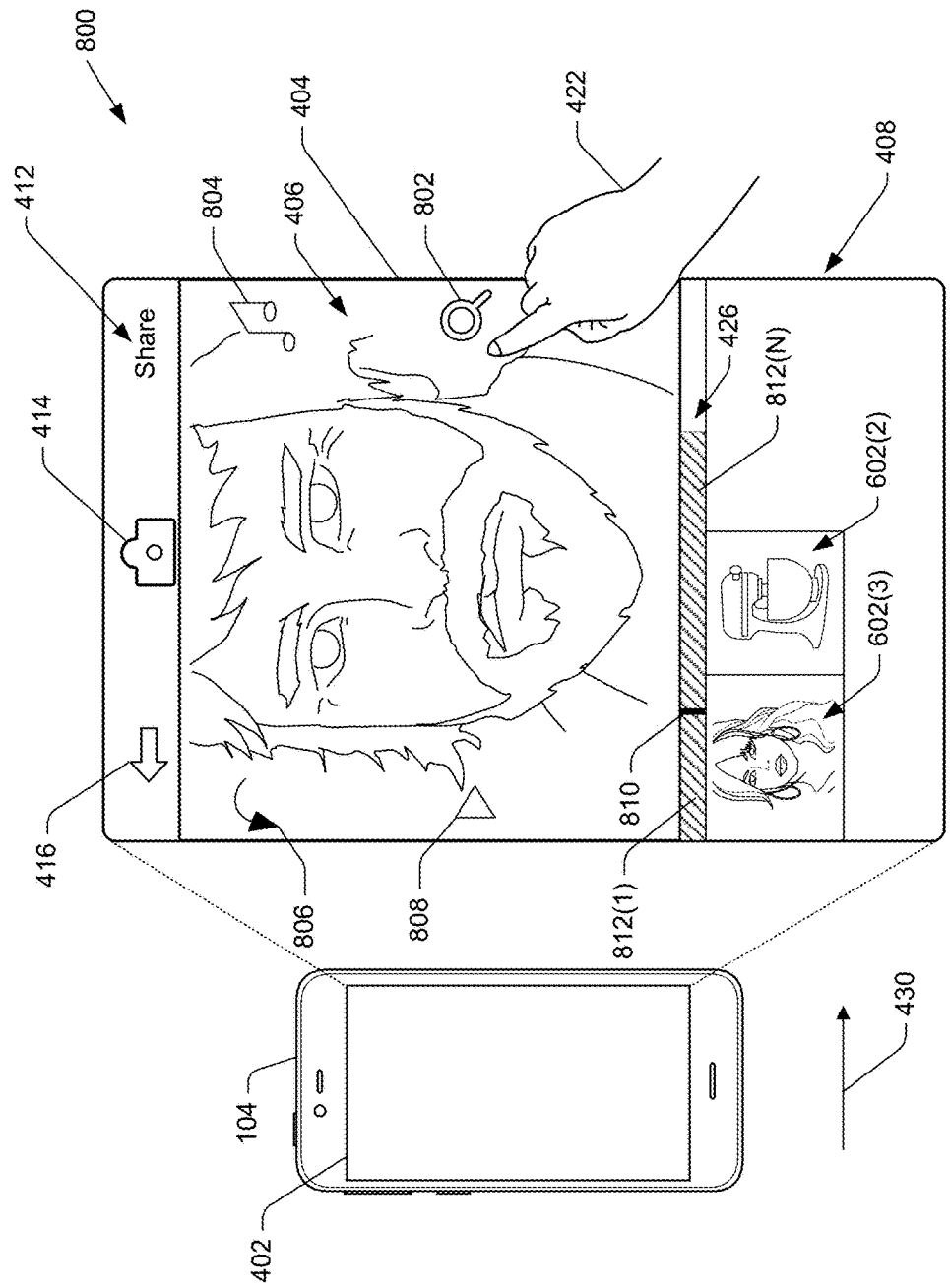
FIG. 8 shows a further illustrative user interface screen displayed on an electronic device that enables users to generate a portion of an example digital media message.

In some embodiments, the progress bar 426 may include a plurality of different portions 428, and each respective portion 428 may correspond to a single respective digital content segment 112 of the digital media message 114 being created and/or played. Such portions may have a visibly different appearance on the display 402 in order to identify the location and/or the amount of time associated with different respective digital content segments 112 to the user 116. For example, such different portions may be displayed using different colors, different shading, different patterns, or other distinct physical characteristics. Additionally, in some embodiments, each of the separate portions 428 may be separated by at least one break included in the progress bar 426. The configuration of such different portions of the progress bar 426 will be described in greater detail below with respect to at least FIGS. 8-10.

The user interface 400 may also include one or more controls 432 configured to assist the user 116 in transitioning to a next stage of digital media message generation. For example, the control 432 may initially not be displayed by the display 402 while a first digital content segment 112 is being recorded. Once recording of the first digital content segment 112 is complete, the other hand, such as when a second input is received via the capture control 420 stopping recording, the control 432 may appear on the display 402. The control 432 may be operable as a "continue" control configured to enable the user 116 to access a plurality of digital content segments 112 for incorporation into the digital media message 114. In some examples, the control 432 may be operable to provide the user 116 with access to one or more folders, libraries, or other such portions of the memory 304 within which a plurality of digital content segments 112 are stored.

In some examples, the first digital content segment 112(1) may be a digital video segment, and the digital video segment may comprise the main or primary content on which the digital media message 114 will be based. In such examples, the first digital content segment 112(1) may have a total elapsed time, length, or duration that defines the elapsed time of the resulting digital media message 114. The elapsed time of the digital video segment may be displayed by the timer 424, and the length of the first portion 428 of the progress bar 426 may represent the length or duration of the digital video segment. Once recording of the first digital content segment 112(1) has been completed, the control 432 may enable the user 116 to access a plurality of additional digital content segments 112(N) for incorporation into the digital media message 114, and the various additional digital content segments 112(N) may comprise additional or supplemental content that may be incorporated into the digital media message 114 as desired. As will be described below, at least part of the first digital content segment 112(1) (e.g., at least part of a digital video segment) may be supplemented, augmented, overwritten, and/or replaced by such additional digital content segments 112(N) during formation of the digital media message 114. For example, a digital image of a second digital content segment 112(2) may replace at least part of a video track of the first digital content segment 112(1). As a result, the digital image of the second digital content segment 112(2) may be presented simultaneously with a portion of an audio track of the first digital content segment 112(1) corresponding to the replaced portion of the video track.

Figure 5:
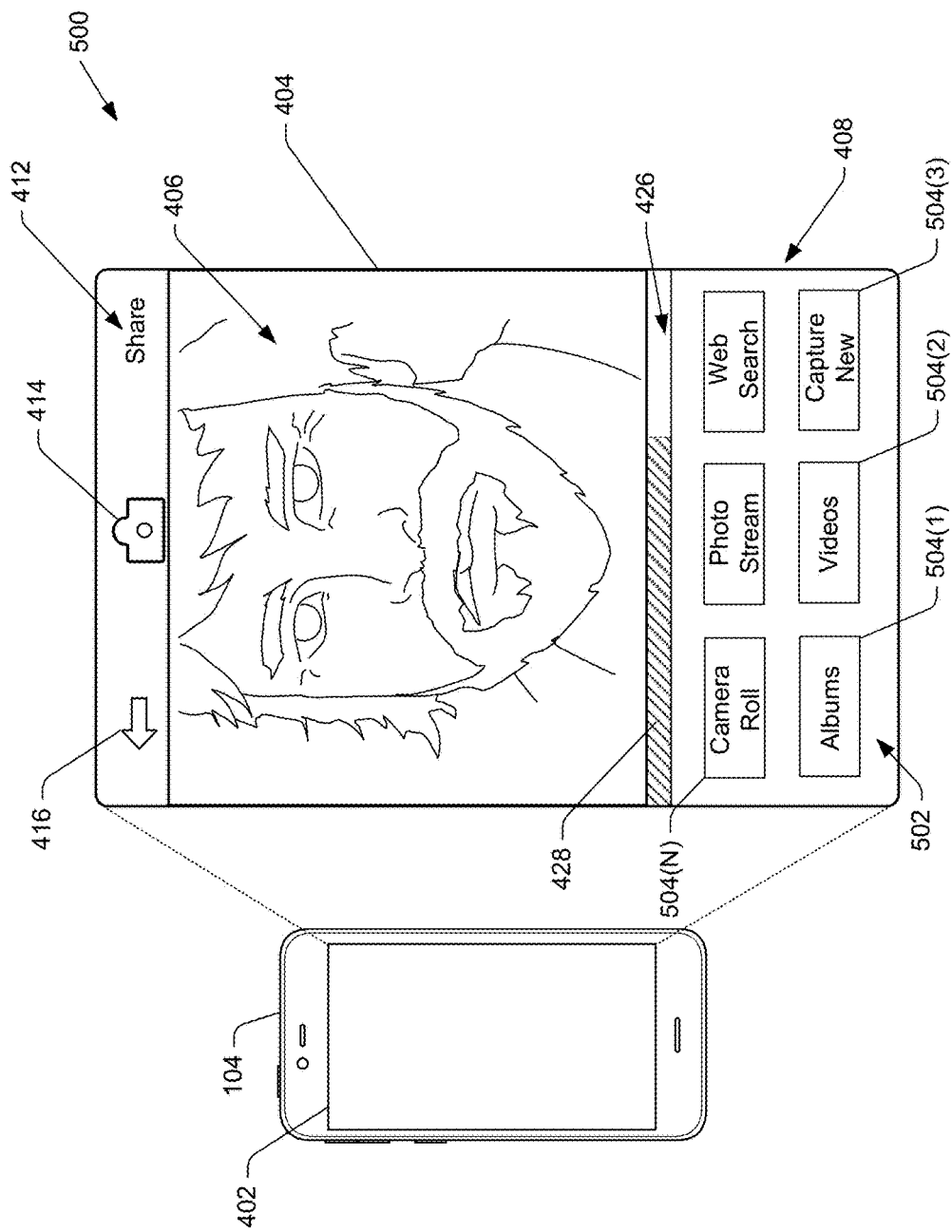
FIG. 5 shows another illustrative user interface screen displayed on an electronic device that enables users to generate a portion of an example digital media message.

FIG. 5 illustrates another example user interface 500 of the present disclosure. In example embodiments, the media message engine 108 may provide such an example user interface 500 during the process of generating a digital media message 114 and, for example, after at least one digital content segment 112 has been received by the media message engine 108 via the electronic device 104. For example, the user interface 500 may be provided by the media message engine 108 in response to receiving an input via the control 432 described above with respect to FIG. 4. Such an example user interface 500 may include, among other things, a plurality of source identifiers 502 indicative of a respective folder, library, or other source of digital content segments 112 stored therein. In example embodiments, such sources may include for example, photo libraries, video libraries, photo streams, albums, or other such sources stored locally in the memory 304 or remotely in, for example, the memory 204 of one or more servers 102. Additionally, such sources may include various website or other web-based sources of content.

In some examples, such source identifiers 502 may comprise and/or may otherwise be identified by a plurality of thumbnails 504(1)-504(N) (collectively, "thumbnails 504"). Each thumbnail 504 may correspond to, for example, a different respective digital content source, and each of the thumbnails 504 may be configured to receive a touch input from the user 116 via the display 402. For example, an input received via a first thumbnail 504(1) may control the media message engine 108 to provide the user 116 with access to one or more digital content segments 112 stored in a variety of albums associated with the memory 304. Similarly, input received via one or more of the additional thumbnails 504 may control the media message engine 108 to provide the user 116 with access to one or more digital content segments 112 stored in video libraries, camera rolls, audio libraries, or other sources. Additionally, one or more of the thumbnails 504 may enable the user 116 to capture additional digital content segments 112 using one or more of the user interface devices 314 described above. Further, one or more of the thumbnails 504 may enable the user 116 to perform an Internet search using, for example, a web browser or other component of the media message engine 108. Such thumbnails 504 may be displayed in the second portion 408 of the display 402. Alternatively, at least one of the thumbnails 504 may be displayed and/or otherwise located in the first portion 404. Additionally, in example embodiments the height, width, and/or other configurations of the first portion 404 and/or the second portion 408 may be adjusted by the user 116 to facilitate display of one or more of the thumbnails 504. For example, the user 116 may provide a touch, swipe, touch and hold, and/or other like input to the display 402 in order to modify the relative size of the first and second portions 404, 408.

Figure 6:
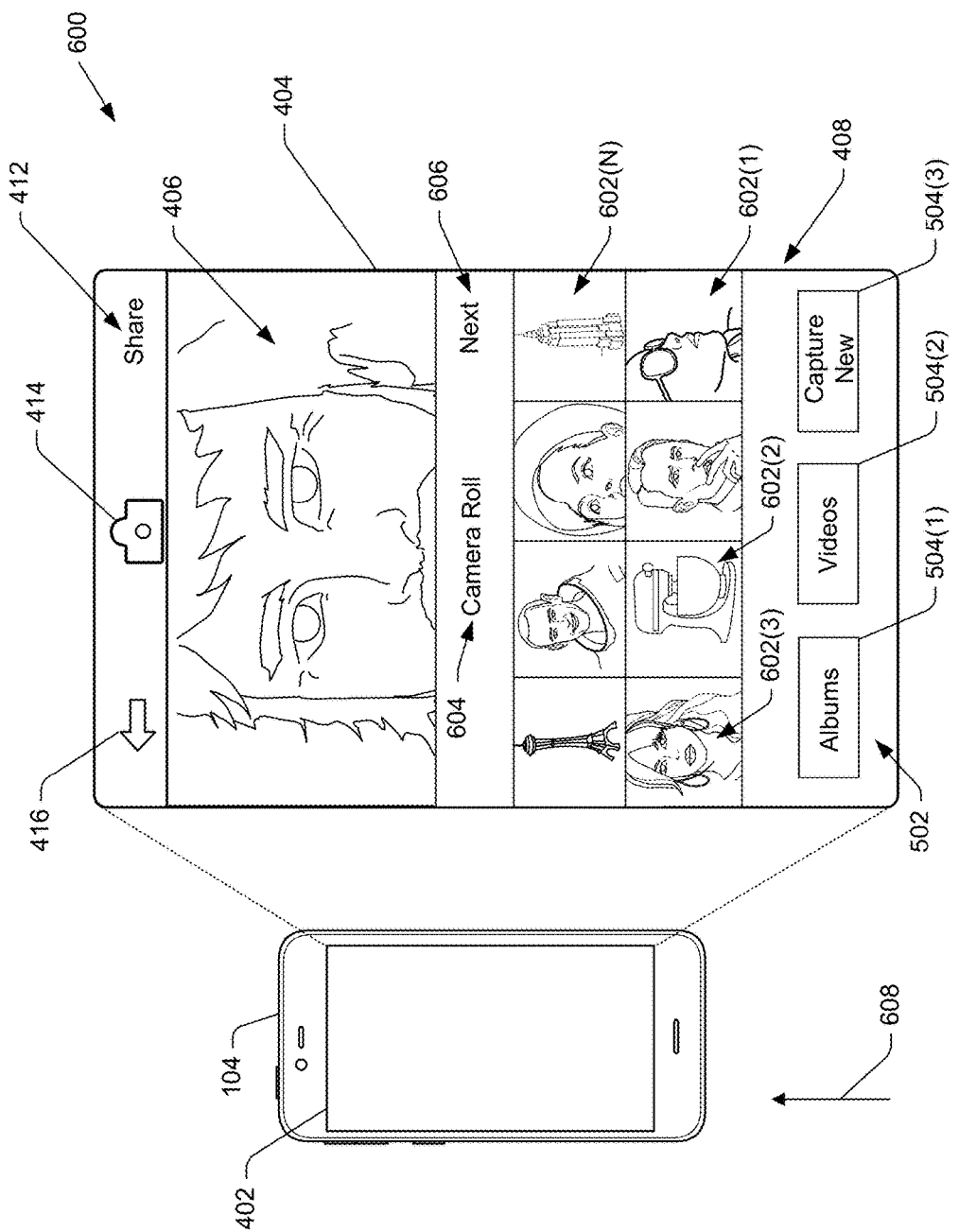
FIG. 6 shows still another illustrative user interface screen displayed on an electronic device that enables users to generate a portion of an example digital media message.

FIG. 6 illustrates an example user interface 600 of the present disclosure in which the second portion 408 has been enlarged relative to the first portion 404 to increase the viewing area of the second portion 408. As noted above, an input received via one or more of the thumbnails 504 may provide access to a plurality of images representative of respective digital content segments 112. The user interface 600 illustrates an example in which a touch input has been received via the "camera roll" thumbnail 504(N) shown in FIG. 5, and in which a plurality of images 602(1)-602(N) (collectively "images 602") have been provided via the display 402 in response. In particular, in response to receiving such an input at the "camera roll" thumbnail 504(N) the media message engine 108 and/or the content display module 308 may control the display 402 to provide a plurality of images 602 corresponding to respective images and/or other digital content segments 112 stored in a camera roll or other portion of the memory 304. In other example embodiments in which an input is received via a different thumbnail 504, on the other hand, the images 602 displayed in the second portion 408 may be representative of digital content segments 112 stored within the particular source identified by the thumbnail 504 receiving the input. For example, in additional embodiments in which an input is received via the "videos" thumbnail 504(2), the media message engine 108 and/or the content display module 308 may control the display 402 to provide a plurality of images 602 corresponding to respective digital video segments and/or other digital content segments 112 stored in a video folder, video library, or other portion of the memory 304.

The example user interface 600 may also include one or more visual indicia 604 indicating, for example, which of the thumbnails 504 has been selected by the user 116, as well as a control 606 operable to transition the user interface 600 to a next phase of a digital media message generation process. For example, the control 606 may comprise a "next" control or other control similar to the navigation control 416 described above. Additionally, as noted above the shape, size, and/or other configurations of the first and/or second portions 404, 408 of the display 402 may be adjusted by the user 116 in order to facilitate viewing the images 602. For example, the user 116 may provide a touch, swipe, touch and hold, and/or other input within the second portion 408 in the direction of arrow 608. Receiving such an input may cause the content display module 308 and/or the media message engine 108 to increase the size of the second portion 408 relative to the size of the first portion 404. Such an input may, as a result, enable a greater number of the images 602 to be viewed via the second portion 408 of the display 402 while the user interface 600 is operable. Alternatively, receiving a touch, swipe, and/or other input in a direction opposite of arrow 608 may cause the content display module 308 and/or the media message engine 108 to decrease the size of the second portion 408 relative to the size of the first portion 404.

Figure 7:
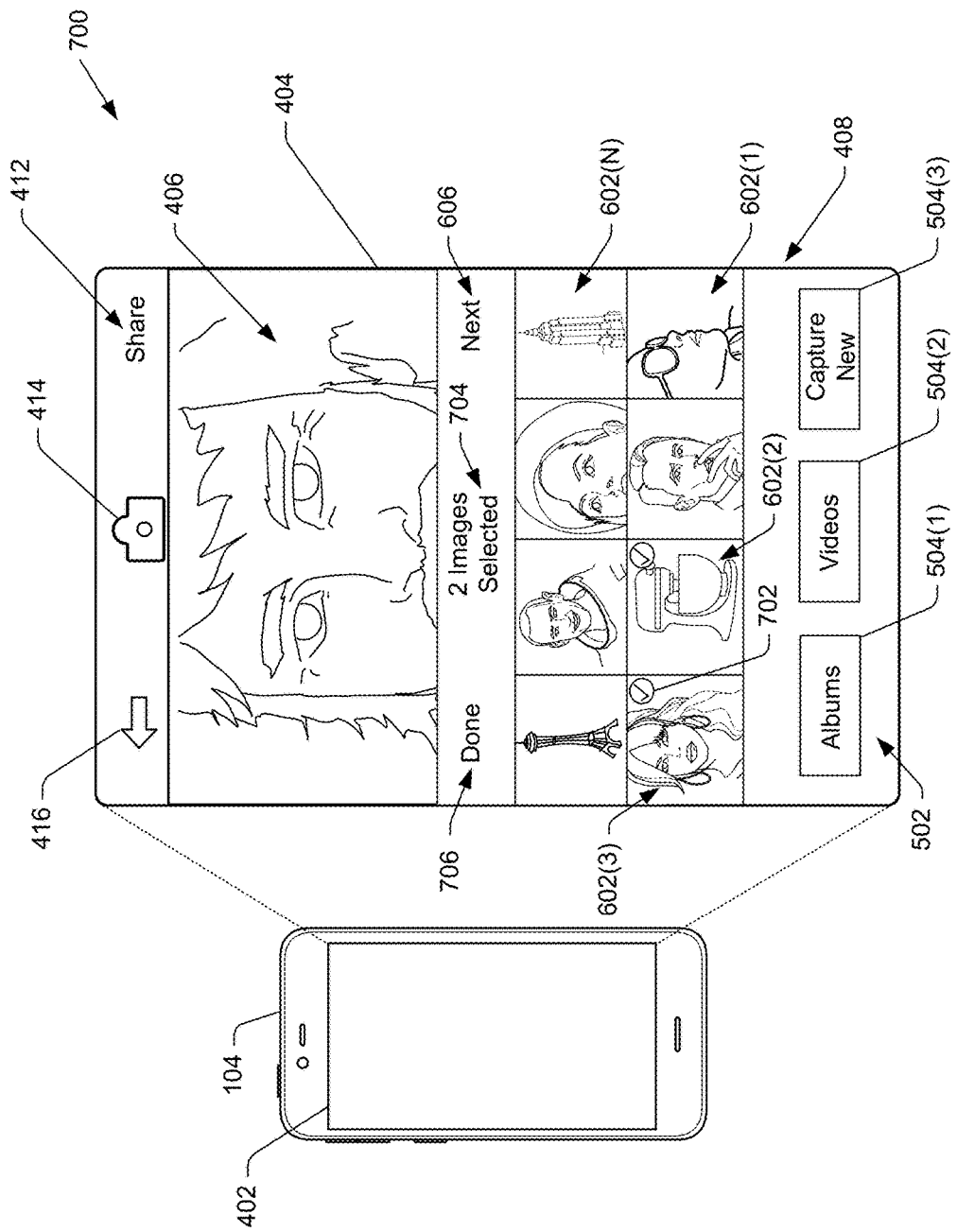
FIG. 7 shows yet another illustrative user interface screen displayed on an electronic device that enables users to generate a portion of an example digital media message.

Similar to the thumbnails 504 described above with respect to FIG. 5, the portion of the display 402 providing each of the images 602 may be configured to receive input from the user 116. For example, the electronic device 104 may receive one or more inputs at a location proximate and/or within the second portion 408 of the display 402. Such an input may be received at, for example, a location in the second portion 408 where a particular image 602 is being displayed. Such an input may be received by the user interface module 310 and/or other components of the media message engine 108 and may be interpreted as indicating selection of a digital content segment 112 associated with the particular image 602 provided at the location in the second portion 408 at which the input was received. As will be described in greater detail below, selecting various digital content segments 112 in this way may assist the user 116 in associating the selected digital content segment 112 with a play sequence of a digital media message 114 being created. Additionally, in response to receiving such inputs via the display 402, the content display module 308 and/or the media message engine 108 may cause the display 402 to provide one or more visual indicia indicating selection of a digital content segment 112 corresponding to the associated image 602. For example, as shown in the example user interface 700 of FIG. 7, the content display module 308 and/or the media message engine 108 may cause an indicator 702 and/or other visual indicia to be displayed on, within, and/or otherwise in association with each of the images 602(2), 602(3) selected by the user 116. In some examples, each indicator 702 may comprise a checkmark, an X, shading, gray scaling, and/or other visual indicia indicating a digital content segment 112 corresponding to the image 602 associated with the indicator 702 has been selected.

The example user interface 700 may also include a plurality of indicators, identifiers, controls, and/or other components useful in generating a digital media message 114. For example, in response to receiving input indicating selection of one or more digital content segments 112, the content display module 308 and/or the media message engine 108 may cause the display 402 to provide one or more identifiers 704 indicating, for example, a quantity of images, photos, videos, and/or other digital content segments 112 that have been selected by the user 116. In some examples, the identifier 704 may also indicate a size, location, date, title, or other information associated with the selected digital content segments 112. Additionally, the user interface 700 may include a control 706 configured to assist the user 116 in transitioning to a next stage of digital media message generation. For example, the control 706 may be displayed on the display 402 in response to receiving an input indicating selection of a digital content segment 112 associated with a corresponding image 602 of the plurality of images 602. When such an input is received, such as via the portion of the display providing the images 602, the content display module 308 and/or the media message engine 108 may cause the display 402 to provide the control 706. The control 706 may be operable as a "done" control configured to enable the user 116 to finish selecting digital content segments 112 for incorporation into the digital media message 114.

In response to receiving an input via the control 706, the content display module 308 and/or the media message engine 108 may cause the display 402 to provide only the selected images 602 in the second portion 408. The user 116 may then arrange the digital content segments 112 associated with the selected images 602 for inclusion in the digital media message 114. For example, as shown in the user interface 800 of FIG. 8, the content display module 308 and/or the media message engine 108 may cause the display 402 to display only the selected images 602(2), 602(3) in response to receiving an input via the control 706. In response to receiving such an input, the content display module 308 and/or the media message engine 108 may also cause the display 402 to provide one or more additional controls. For example, the user interface 800 may include a search control 802 operable to enable the user 116 to conduct one or more web-based searches for additional digital content. The user interface 800 may also include an audio selection control 804 configured to enable the user 116 to add audio clips or other such digital media to a digital media message 114 currently under creation. Further, the user interface 800 may include an editing control 806 substantially similar to the control 418 described above with respect to FIG. 4, as well as a preview control 808 operable to provide a preview of the digital media message 114 via the display 402 for review by the user 116. Each of the controls 802, 804, 806, 808 may be configured to receive one or more touch inputs from the user 116, and the content display module 308 and/or the media message engine 108 may cause the electronic device 104 to perform any of the functions described above with respect to the respective controls 802, 804, 806, 808 in response to such input.

The user interface 800 may also include the progress bar 426 described above. The progress bar 426 may be useful in providing visual indicia of the elapsed playtime of the digital media message 114 being created. The progress bar 426 may also enable the user 116 to visualize various different portions of the digital media message 114 and, in particular, to visualize the various locations within the digital media message 114 at which different digital content segments 112 have been added. For example, the progress bar 426 may include a play marker 810 and a plurality of separate and distinct portions 812(1)-812(N) (collectively "portions 812"). Taken together, the plurality of portions 812 may provide visual indicia of a play sequence of the digital media message 114 currently being generated. Each respective portion 812 of the progress bar 426 may correspond to and/or be indicative of a respective location in and/or portion of such a play sequence. Additionally, one or more digital content segments 112 may be associated with each portion 812 of the progress bar 426. As a result, the progress bar 426 may indicate the order and the elapsed time in which each of the digital content segments 112 will be played and/or otherwise presented. In example embodiments, size, length, and/or other configurations of each portion 812 may be indicative of such an elapsed time. Further, the arrangement of each portion 812 from left to right along the display 402 may be indicative of such an order.

The user interface 800 may enable the user 116 to allocate and/or otherwise associate the digital content segments 112 selected using the user interface 700 with the play sequence of the digital media message 114 in any desired way. For example, the first portion 404 of the display 402 may be configured to receive an input from the user 116, such as a touch and hold input. In response to receiving such an input via the display 402, the content display module 308 and/or the media message engine 108 may cause the display 402 to provide a previously captured digital video segment or other like digital content segment 112. Such a first digital content segment 112(1) may be, for example, associated with a first location in the play sequence of the digital media message 114, and a first portion 812(1) of the progress bar 426 may be associated with the first digital content segment 112(1).

As noted above, in some embodiments the first digital content segment 112(1) selected by the user 116 may be used as the background, template, and/or baseline for the digital media message 114 being generated. In such example embodiments, the remaining digital content segments selected by the user 116 may be added to, merged with, and/or otherwise combined with the first digital content segment 112(1) to form the digital media message 114. In such embodiments, the full length of the progress bar 426 may be representative of the full duration and/or elapsed time of the first digital content segment 112(1). For example, when the first digital content segment 112(1) comprises a digital video segment, the full length of the progress bar 426 may represent the total elapsed time of the digital video segment. In such examples, various parts and/or portions of the digital video segment may be associated with the play sequence of the digital media message 114 as desired by the user 116, and additional digital content segments 112(N) selected by the user 116 may be incorporated into the digital media message 114 to supplement and/or augment the first digital content segment 112(1). In some examples, such additional digital content segments 112(N) may overwrite and/or replace portions of the underlying first digital content segment 112(1).

For example, the first digital content segment 112(1) may comprise a digital video segment. In such examples, the digital video segment may include an audio portion or "audio track" recorded by a microphone of the electronic device 104 and a corresponding video portion or "video track" recorded in unison with the audio track by a camera of the electronic device 104. When the media message engine 108 receives a touch and hold input via the first portion 404 of the display 402, a first portion of the first digital content segment 112(1) (e.g., corresponding first portions of the audio and video tracks of the digital video segment) may be associated with a respective location in the play sequence. Such a respective location may be represented by the first portion 812(1) of the progress bar 426. Once touch contact with the first portion 404 of the display 402 is discontinued, however, the user 116 may select a second digital content segment 112(2) for inclusion in the play sequence. The second digital content segment 112(2) may be associated with the play sequence such that the second digital content segment 112(2) will be presented simultaneously with a second portion of the first digital content segment 112(1) (e.g., at least part of a second portion of digital video segment). The second portion of the first digital content segment 112(1) that is included in the play sequence may be dependent upon a content type (e.g., audio, video, photo, image, etc.) of the selected second digital content segment 112(2). For example, if the second digital content segment 112(2) comprises a photo or other digital image that does not include audio, the digital image of the second digital content segment 112(2) may be added to the play sequence such that the image will be presented simultaneously with audio from the first digital content segment 112(1). In particular, in embodiments in which the first digital content segment 112(1) comprises a digital video segment, the digital image of the second digital content segment 112(2) may replace the video track of the second portion of the digital video segment. As a result, the digital image of the second digital content segment 112(2) ma be presented simultaneously with the audio track of the second portion of the digital video segment when the digital media message 114 is played. Thus, in example embodiments video or still image content in a video track of the first digital content segment 112(1) may be replaced with the same type of content (e.g., video, images, photos, etc.) present in the second digital content segment 112(2) with which the first digital content segment 112(1) is combined.

In some examples the content interface module 306, content display module 308, and/or other components of the media message engine 108 may segment each digital content segment 112 into its respective components or content types. For example, a digital video segment received by the media message engine 108 may be segmented into an audio track and a separate video track. Some digital content segments 112, such as digital images, audio clips, and the like may be segmented into only a single track/component depending on the content type associated with such digital content segments 112. Once the digital content segments 112(N) have been segmented in this way, the media message engine 108 may replace various tracks of portions of the digital content segments 112 based on the input received from the user 116 during generation of the digital media message 114.

Figure 9:
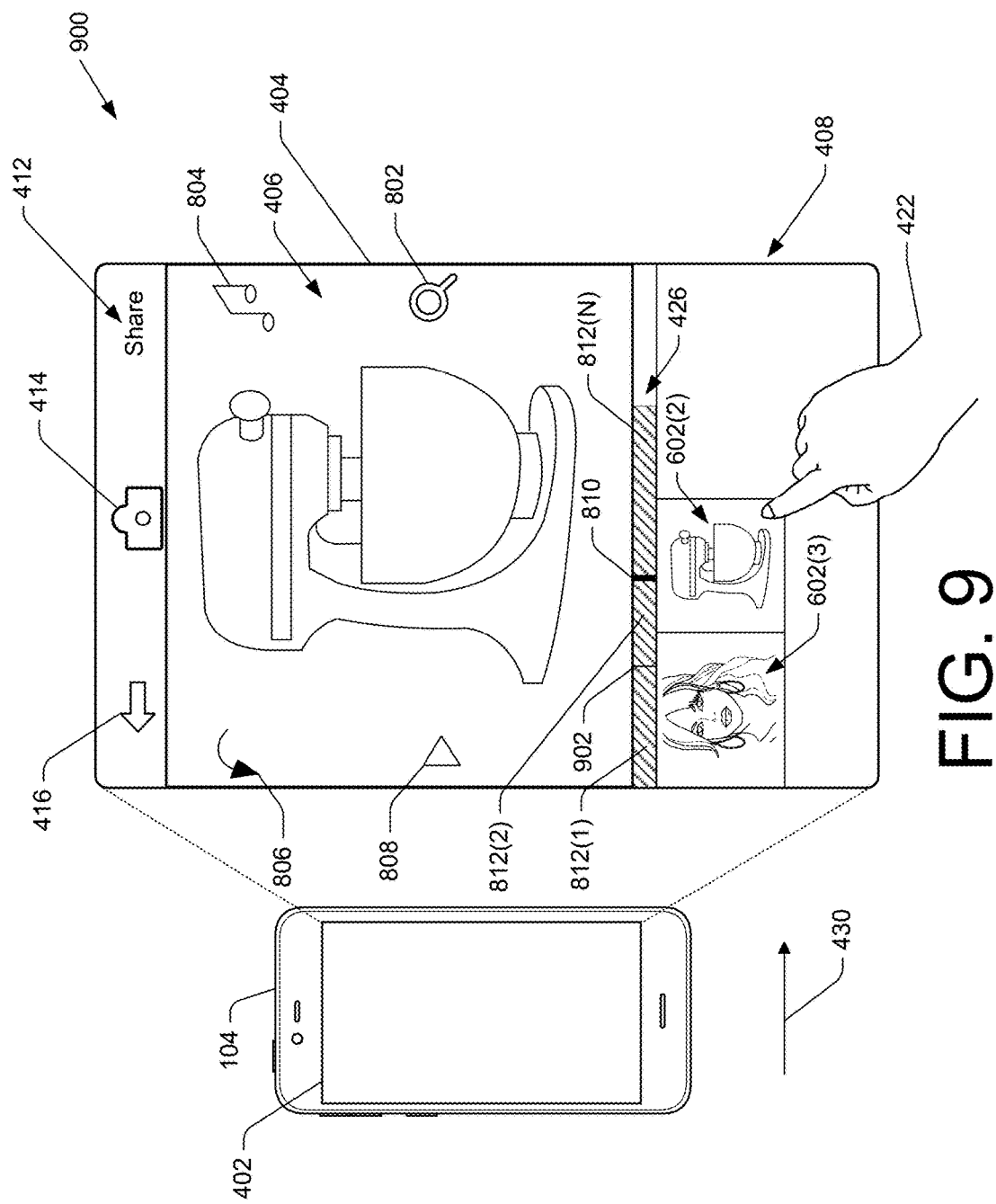
FIG. 9 shows another illustrative user interface screen displayed on an electronic device that enables users to generate a portion of an example digital media message.

FIG. 9 illustrates a further user interface 900 of the present disclosure. In the example embodiment of FIG. 9, the first portion 812(1) of the progress bar 426 may be indicative of and/or otherwise associated with a corresponding first portion of a first digital content segment 112(1) (e.g., corresponding first portions of the audio and video tracks of a digital video segment) that has been added to the play sequence. The progress bar 426 may also include a break 902 and/or other visual indicia indicating the location in the play sequence at which the user 116 selected, for example, a second digital content segment 112(2) represented by the second image 602(2) for inclusion in the play sequence. For example, by providing a touch and hold input at the location on the display 402 at which the second image 602(2) is being displayed, the second digital content segment 112(2) represented by the second image 602(2) may be added to the play sequence. The second digital content segment 112(2) may be added to the second location in the play sequence along with audio from a second portion of the digital video segment that sequentially follows the first portion of the digital video segment. For example, a digital image of the second digital content segment 112(2) may be added to the play sequence and may replace the video track of the second portion of the digital video segment. As noted above, the audio track from the second portion of the digital video segment may be presented simultaneously with the image of the second digital content segment 112(2) when the digital media message 114 is played. In such embodiments, the digital image of the second digital content segment 112(2) may replace the images and/or video included in the video track of the second portion of the digital video segment. Additionally, the second location in the play sequence may be represented by the second portion 812(2) of the progress bar 426. The play marker 810 may move in the direction of arrow 430, in real time, as the digital media message generation process progresses. Further, the second digital content segment 112(2) corresponding to the second image 602(2) may be displayed in the first portion 404 while a touch and hold input is received at the location of the second image 602(2) in the second portion 408. The length of time that the touch and hold input is received at the location of the second image 602(2) in the second portion 408 may correspond to and/or may determine the length of time for which the second digital content segment 112(2) corresponding to the second image 602(2) may be displayed when the digital media message 114 is played. Further, the length of time that the touch and hold input is received at the location of the second image 602(2) may determine the length of the video track from the second portion of the digital video segment that is replaced by the image of the second digital content segment 112(2).

In example embodiments, the second digital content segment 112(2) and the audio track from the second portion of the digital video segment may be combined to form a combined segment of the digital media message 114. For example, upon receiving a touch and hold input at the location on the display 402 at which the second image 602(2) is being displayed, the media message engine 108 may combine the second digital content segment 112(2) with the audio track of the second portion of the digital video segment, and may configure the combined segment such that the audio track of the second portion of the digital video segment is presented simultaneously with the image of second digital content segment 112(2) when the digital media message 114 is played.

Figure 10:
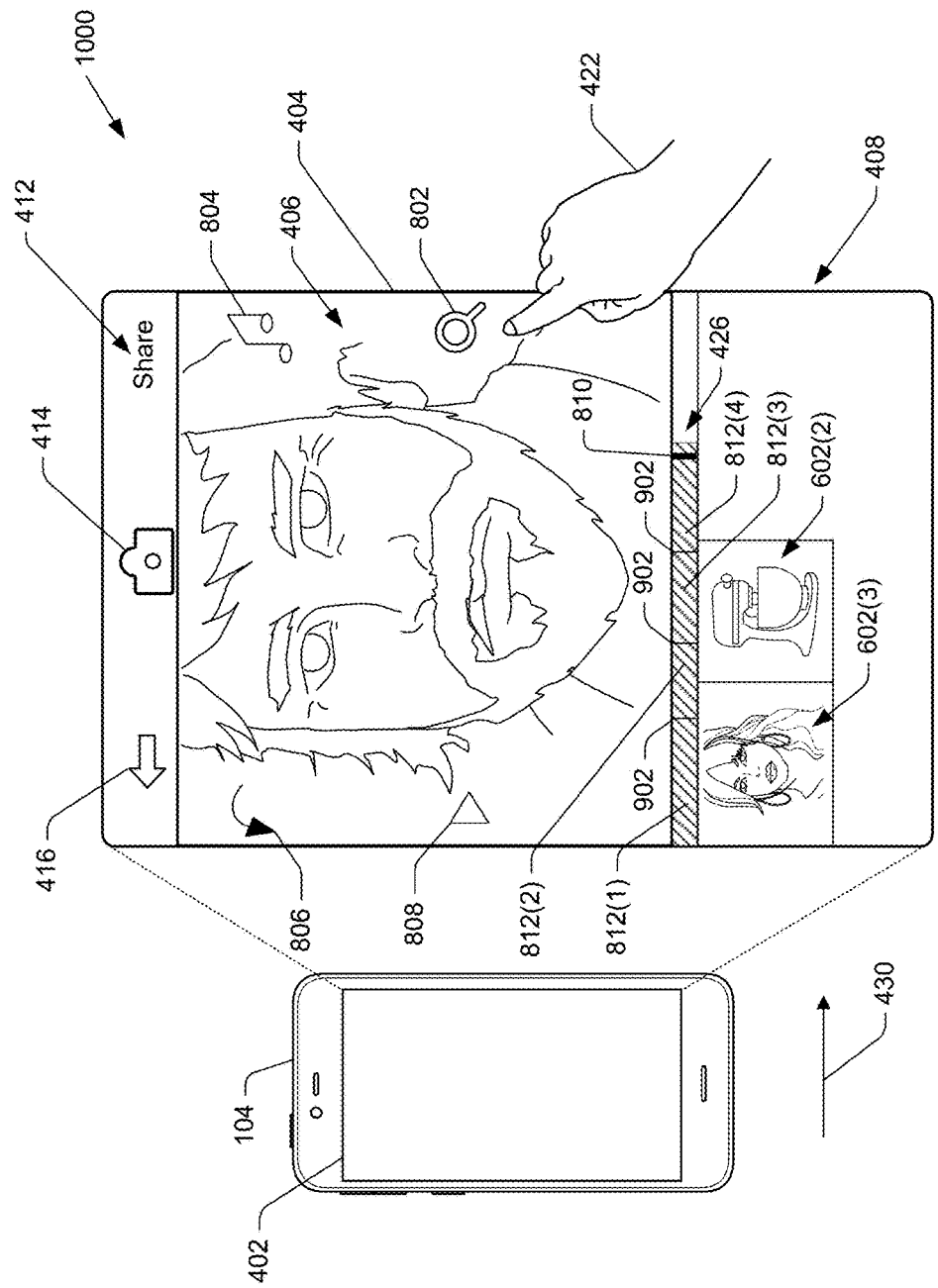
FIG. 10 shows still another illustrative user interface screen displayed on an electronic device that enables users to generate a portion of an example digital media message.

Once touch contact with the location on the display 402 at which the second image 602(2) is being displayed is discontinued, the user 116 may select any number of additional digital content segments 112(N) for inclusion in the play sequence. For example, as illustrated by the example user interface 1000 of FIG. 10, a third digital content segment 112(3) corresponding to the third image 602(3) may be selected for inclusion in the play sequence. In particular, a third portion 812(3) of the progress bar 426 may correspond to a portion of the play sequence in which the third digital content segment 112(3) has been added. Similar to the process described above with respect to FIG. 9, by providing a touch and hold input at the location on the display 402 at which the third image 602(3) is being displayed, the third digital content segment 112(3) represented by the third image 602(3) may be added to the play sequence along with, for example, the audio track from a third portion of the digital video segment that sequentially follows the second portion of the digital video segment. In this way, audio from the third portion of the digital video segment may be presented simultaneously with the third digital content segment 112(3) when the digital media message 114 is played. The progress bar 426 may also include a break 902 and/or other visual indicia indicating the location in the play sequence at which the user 116 selected the third digital content segment 112(3) represented by the third image 602(3) for inclusion in the play sequence. As shown in FIG. 10, respective breaks 902 may be positioned in the progress bar 426 separating the first and second portions 812(1), 812(2), as well as the second and third portions 812(2), 812(3).

Moreover, in the embodiment of FIG. 10, the third digital content segment 112(3) and the audio track from the third portion of the digital video segment may be combined to form an additional combined segment of the digital media message 114. For example, upon receiving a touch and hold input at the location on the display 402 at which the third image 602(3) is being displayed, the media message engine 108 may combine the third digital content segment 112(3) with the audio track from the third portion of the digital video segment, and may configure the additional combined segment such that the audio track from the third portion of the digital video segment is presented simultaneously with the digital image of the third digital content segment 112(3) when the digital media message 114 is played.

The user 116 may also provide further touch and/or touch and hold input via the first portion 404 of the display 402, and such input may direct the media message engine 108 to form an additional parts and/or portions of the digital media message 114. For example, FIG. 10 illustrates an example user interface 1000 in which the hand 422 of the user 116 provides a touch and hold input at the first portion 404 of the display 402 after the third digital content segment 112(3) associated with the third image 602(3) has been added to the play sequence of the digital media message 114. Upon receiving such an input, the media message engine 108 may add and/or otherwise associate a fourth portion of the digital video segment with the play sequence. In particular, in response to receiving a touch and hold input at the first portion 404 of the display 402, the media message engine 108 may associate the fourth portion of the digital video segment with the play sequence such that the audio and video tracks from the fourth portion of the digital video segment are presented at a fourth location in the play sequence following the third location. Such a fourth location in the play sequence is illustrated by a fourth portion 812(4) of the progress bar 426. Additionally, the fourth portion 812(4) may be visually separated from the third portion 812(3) by an additional break 902 disposed therebetween.

In such embodiments, the first and fourth portions 812(1), 812(4) of the progress bar 426 may have similar visual indicia, and such indicia may indicate that the first and fourth portions 812(1), 812(4) comprise both audio and video from the digital video segment. For example, the first and fourth portions 812(1), 812(4) may be displayed using a common first color, a common first pattern, and/or other common visual indicia to indicate that content associated with these portions is similar in type. In such embodiments, the second and third portions 812(2), 812(3) may also have similar visual indicia, and such indicia may indicate that the second and third portions 812(2), 812(3) comprise audio from the digital video segment and a digital image from respective digital content segments 112(2), 112(3). For example, the second and third portions 812(2), 812(3) may be displayed using a common second color, a common second pattern, and/or other common visual indicia to indicate that content associated with these portions is similar in type. Additionally, in such embodiments the first visual indicia common to the first and fourth portions 812(1), 812(4) may be different from the second visual indicia common to the second and third portions 812(2), 812(3). Such differing visual indicia may indicate that the type of content associated with the first and fourth portions 812(1), 812(4) (e.g., audio and video from the digital video segment) is different from the type of content associated with the second and third portions 812(2), 812(3) (e.g., audio from the digital video segment and a digital image from respective digital content segments).

Figure 11:
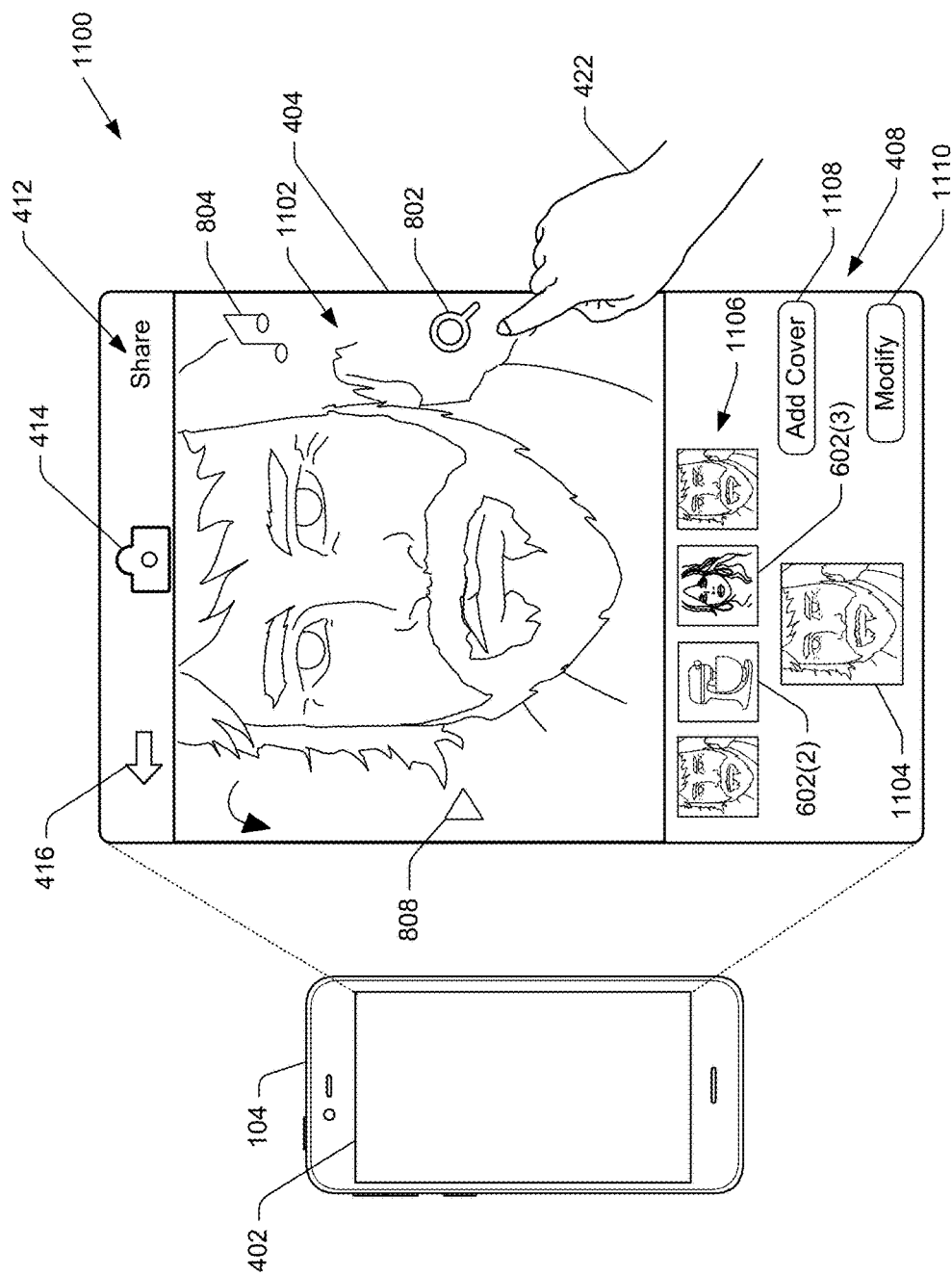
FIG. 11 shows yet another illustrative user interface screen displayed on an electronic device that enables users to generate a portion of an example digital media message.

FIG. 11 illustrates another example user interface 1100 of the present disclosure. In example embodiments, the media message engine 108 may provide such an example user interface 1100 in response to receiving one or more inputs via one or more of the controls described above. For example, the media message engine 108 may receive a touch input or other such input indicating selection of the share control 412. In response to receiving such an input, the media message engine 108 may provide an image 1102 via the display 402. Such an image 1102 may comprise, for example, one or more images, photos, or first frames of a digital video segment stored in the memory 304 of the electronic device 104. Alternatively, the content display module 308 may present one or more images 1102 in the first portion 404 that are obtained in real time via, for example, a camera or other user interface device 314 of the electronic device 104. For example, the first portion 404 may provide an image 1102 of objects that are within a field of view of the camera.

The media message engine 108 may also provide a message thumbnail 1104 via the display 402. In example embodiments, such a message thumbnail 1104 may be similar to one or more of the images 602 described above. In some examples, however, the message thumbnail 1104 may be larger than one or more of the images 602, and/or may have one or more visual characteristics (e.g., highlighting, shading, a label, a frame, etc.) configured to enable the user 116 to distinguish the message thumbnail 1104 from one or more images 602 concurrently displayed in, for example, the second portion 408. For example, the message thumbnail 1104 may be provided at the second portion 408 of the display 402 simultaneously with visual indicia 1106 indicative of the play sequence of the digital media message 114. In example embodiments, the visual indicia 1106 of the play sequence may include the images 602, digital video segments, and/or other portions included in the play sequence, arranged in the order in which such content will appear when the digital media message 114 is played. In such embodiments, the message thumbnail 1104 may be disposed above, beneath, to the side of, and/or at any other location on the display 402 relative to the visual indicia 1106 of the play sequence such that the user 116 may easily identify the message thumbnail 1104 as being distinct from the images 602 and/or other components of the visual indicia 1106. In example embodiments, the message thumbnail 1104 may comprise, for example, a first frame and/or any other image or content indicative of the digital media message 114 being generated by the user 116. As a result, it may be desirable for the media message engine 108 to present the message thumbnail 1104 with one or more visual characteristics enabling the user 116 to identify the message thumbnail 1104 with relative ease.

The example user interface 1100 may also include one or more additional controls configured to assist the user 116 in making further modifications to one or more of the digital content segments 112, the play sequence, and/or other components of the digital media message 114. For example, the user interface 1100 may include a control 1108 configured to enable the user 116 to add one or more cover images, cover videos, cover photos, and/or other content to the digital media message 114. In example embodiments, the media message engine 108 may receive an input, such as a touch input, indicative of selection of the control 1108 by the user 116. In response to receiving such an input, the media message engine 108 may enable the user 116 to browse various photos, images, videos, and/or other content stored in the memory 304 and/or in the memory 204 of the server 102. Additionally and/or alternatively, in response to receiving such an input, the media message engine 108 may enable the user 116 to perform a web-based search, such as via one or more search engines or applications of the electronic device 104, for such content. The user 116 may be permitted to select one or more such content items for use as, for example, a cover image and/or other indicator of the digital media message 114 currently being generated. Upon selection of such a content item, the media message engine 108 may add the selected item to the play sequence of the digital media message 114 and/or may combine the selected item with one or more content segments 112 of the digital media message 114.

The user interface 1100 may further include one or more controls 1110 configured to enable the user 116 to modify one or more of the digital content segments 112, the play sequence, and/or other components of the digital media message 114. Such controls 1110 may comprise, among other things, any audio, video, image, or other editing tools known in the art. In example embodiments, such controls 1110 may provide editing functionality enabling the user 116 to delete, move, modify, augment, cut, paste, copy, save, or otherwise alter portions of each digital content segment 112 as part of generating a digital media message 114. Additionally, one or more of the controls 1110 may enable a user 116 to add, remove, cut, paste, draw, rotate, flip, shade, color, fade, darken, and/or otherwise modify various aspects of the digital media message 114 and/or various digital content segments 112 included in the play sequence thereof.

In some embodiments, at least one of the controls 1110 may be similar to and/or the same as one or more of the controls 418 described above.

Additionally, the user interface 1100 may include one or more controls (not shown) configured to enable the user 116 to add one or more audio clips, segments, files, and/or other content to the digital media message 114. In example embodiments, the media message engine 108 may receive an input, such as a touch input, indicative of selection of such a control by the user 116. In response to receiving such an input, the media message engine 108 may enable the user 116 to browse various audio files and/or other content stored in the memory 304 and/or in the memory 204 of the server 102. Additionally and/or alternatively, in response to receiving such an input, the media message engine 108 may enable the user 116 to perform a web-based search, such as via one or more search engines or applications of the electronic device 104, for such content. The user 116 may be permitted to select one or more such content items, and upon selection of such a content item, the media message engine 108 may add the selected item to the play sequence of the digital media message 114 and/or may combine the selected item with one or more content segments 112 of the digital media message 114.

The user interface 1100 may also include the share control 412 and/or the next control 606 described above. Upon selection thereof by the user 116, the media message engine 108 may enable the user 116 to browse forward to a next user interface configured to assist the user 116 in generating, modifying, and/or sharing the digital media message 114.

Figure 12:
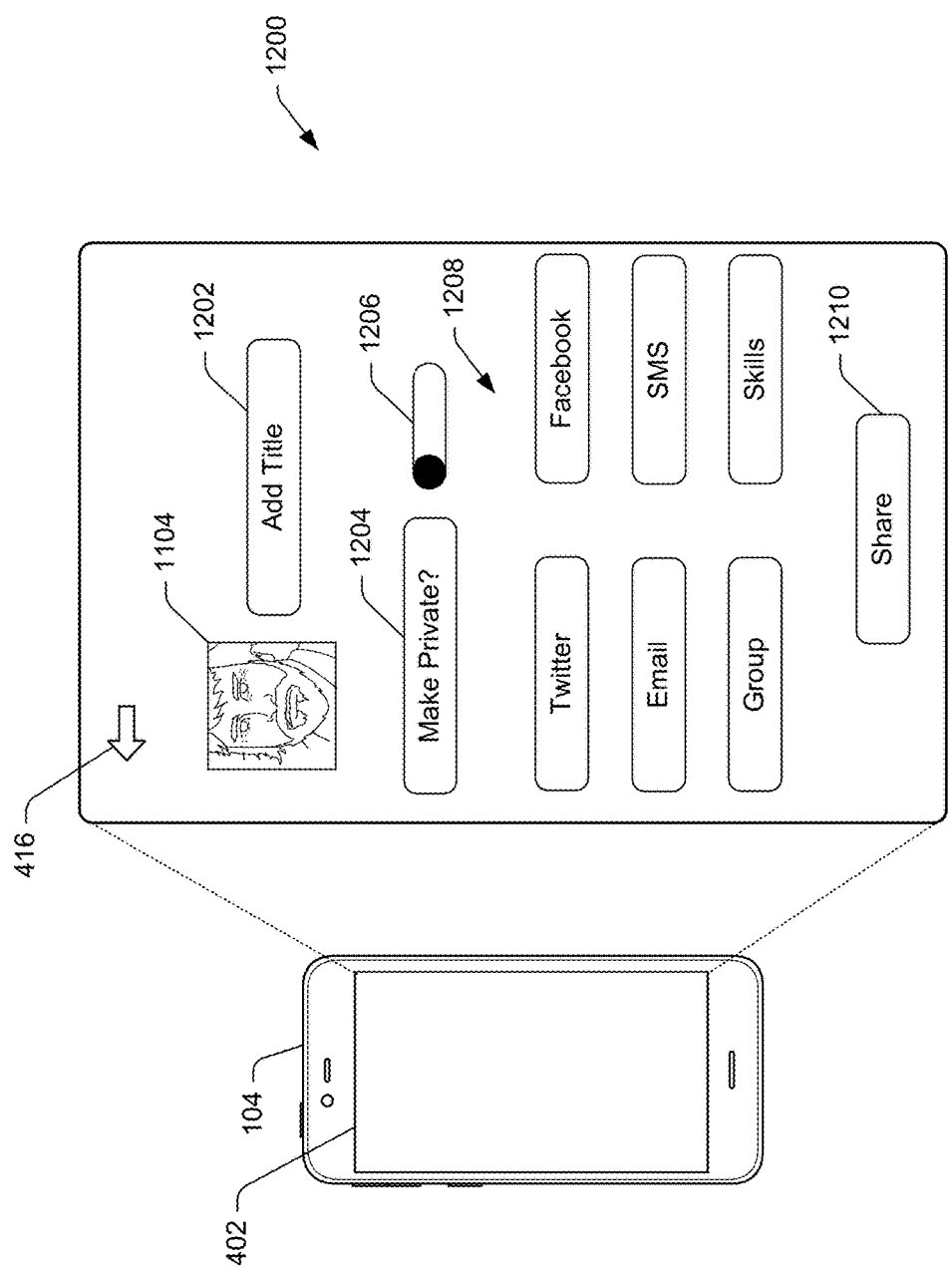
FIG. 12 shows an illustrative user interface screen displayed on an electronic device that enables users to share an example digital media message.

For example, the media message engine 108 may receive an input, such as a touch input, indicating selection of the share control 412 by the user 116. In response to receiving such an input, the media message engine 108 may provide the example user interface 1200 illustrated in FIG. 12. Such an example user interface 1200 may include, among other things, the message thumbnail 1104 indicating and/or otherwise identifying the digital media message 114 that the user 116 desires to share. Such an example user interface 1200 may also include a plurality of controls configured to assist the user 116 in providing the digital media message 114 for sharing with, for example, a remote electronic device 118, such as via the network 106. For example, one or more of the controls 1202 may enable the user 116 to add a title, a name, and/or other identifier to the media message 114 such that the media message 114 may be easily recognizable and/or identifiable by one or more users 120 of the remote electronic device 118. In some examples, the title and/or other identifier added to the media message 114 may be provided to the user 120 simultaneously and/or otherwise in conjunction with the digital media message 114 when the user 120 consumers at least a portion of the digital media message 114 on the remote electronic device 118.

In addition, the user interface 1200 may include one or more controls 1204, 1206 configured to enable the user 116 to privatize the digital media message 114 prior to providing the digital media message 114 for sharing with a remote electronic device 118. For example, one or more such controls 1204 may enable the user 116 to encrypt and/or otherwise configure the digital media message 114 such that only an approved user 120 or plurality of users 120 may receive and/or access the digital media message 114. In example embodiments, the media message engine 108 may receive an input, such as a touch input, indicating selection of the control 1204 by the user 116. In response to receiving such an input, the media message engine 108 may enable the user 116 to browse, for example, an address book or other like directory stored in the memory 304 of the electronic device 104 and/or in the memory 204 of the server 102. Upon browsing such a directory, the user 116 may select one or more contacts approved by the user 116 to have access to the digital media message 114. Additionally and/or alternatively, in response to receiving such an input, the media message engine 108 may enable the user 116 to password protect and/or otherwise encrypt the digital media message 114 prior to sharing. In any of the example embodiments described herein, one or more of the controls 1206 may comprise a slide bar and/or other like icon indicating whether the user 116 has privatized the digital media message 114. For example, such a control 1206 may change color, transition between a "no" indication and a "yes" indication, and/or may otherwise provide a visual indication of the privacy status/level of the digital media message 114.

The user interface 1200 may also include one or more controls 1208 configured to enable the user 116 to select one or more means of providing the digital media message 114 for sharing with a remote electronic device 118. For example, one or more such controls 1208 may enable the user 116 to select from a plurality of common social media websites and/or other portals useful in sharing the digital media message 114. In such example embodiments, the media message engine 108 may receive an input, such as a touch input, indicating of selection of the control 1208 by the user 116. In response to receiving such an input, the media message engine 108 may enable the user 116 to access an existing account on the selected social media portal. Once such an account has been accessed, the media message engine 108 may provide the digital media message 114 to the selected social media portal for sharing with remote users 120 via the selected portal.

One or more such controls 1208 may also enable the user 116 to select between email, text messaging (SMS), instant messaging, and/or other like means for sharing the digital media message 114. In such example embodiments, the media message engine 108 may receive an input, such as a touch input, indicating selection of the control 1208 by the user 116. In response to receiving such an input, the media message engine 108 may enable the user 116 to browse, for example, an address book or other like directory stored in the memory 304 of the electronic device 104 and/or in the memory 204 of the server 102. Upon browsing such a directory, the user 116 may select one or more contacts with which the user 116 desires to share the digital media message 114. Upon selecting such contacts, the user 116 may provide the digital media message 114 to the selected users by providing an input, such as a touch input, indicative of selection of a share control 1210.

Illustrative Methods

Figure 13:
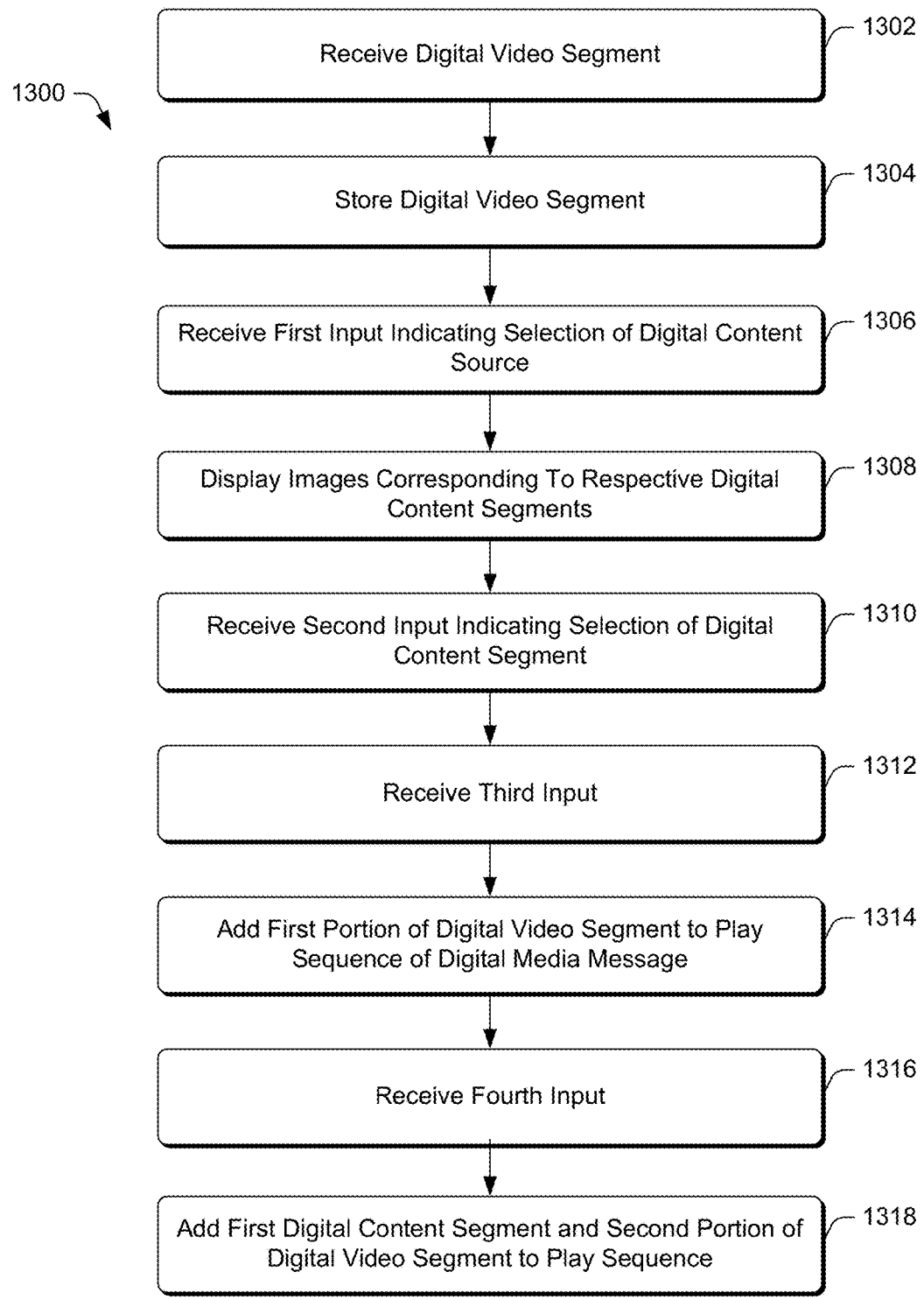
FIG. 13 is a flow diagram of an illustrative method of generating a digital media message.

FIG. 13 shows an illustrative method 1300 of generating an example digital media message 114. The example method 1300 is illustrated as a collection of steps in a logical flow diagram, which represents a sequence of operations that can be implemented in hardware, software, or a combination thereof. In the context of software, the steps represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, and unless otherwise specified, the method 1300 is described with reference to the environment 100 of FIG. 1.

At block 1302, the media message engine 108 may receive a first digital content segment 112(1) via the electronic device 104. For example, in some embodiments the digital content segment 112(1) may be one of a digital video segment, an audio segment, a photo, an image, and/or other such content. In some embodiments, receiving the content segment 112(1) at block 1302 may include causing the electronic device 104 to capture a first digital video segment, audio segment, photo, image, or other such content using one or more of the user interface devices 314.

Additionally, in some embodiments receiving the first content segment 112(1) at block 1302 may include receiving input from the user 116, such as a touch input received via the display 402, indicative of a selection of an image 602 associated with the first digital content segment 112(1). For example, as noted above with respect to at least FIG. 6, the media message engine 108 may present a plurality of images to the user 116 via the display 402. In such embodiments, each image 602 may represent a respective digital content segment 112 of a plurality of digital content segments stored in the memory 304 and/or the memory 204. In such examples, the input received from the user 116 may be indicative of a selection of a particular image 602 corresponding to the first digital content segment 112(1). Accordingly, in such embodiments the media message engine 108 may receive the first content segment 112(1) by way of the user 116 selecting a particular image 602, thumbnail, and/or other indicia corresponding to the first digital content segment 112(1).

At block 1304, the media message engine 108 may cause the captured first content segment 112(1) to be stored in the memory 304 and/or the memory 204 of the server 102 for future use. Additionally, once the digital video segment, digital audio segment, digital image, and/or other digital content segment 112(1) is captured at block 1302, the media message engine 108 may cause at least one such digital content segment to be provided via the display 402. For example, the content display module 308 may cause a plurality of images 602 to be rendered and/or otherwise provided via the display 402. In such examples, each image of the plurality of images 602 may correspond to and/or otherwise be indicative of a respective digital content segment 112, and such images may be provided such that the user 116 may view and/or select a digital content segment 112 associated with one or more such images 602 for inclusion in a digital media message 114 being created.

For example, at block 1306 the media message engine 108 may cause the display 402 to render and/or otherwise provide visual indicia of one or more digital content sources associated with the digital content segments 112 described above. For example, as described with respect to FIG. 5, in some embodiments the media message engine 108 may cause the display 402 to provide a plurality of thumbnails 504. Each of the thumbnails 504 may be configured to receive one or more inputs from the user 116 indicating selection of a digital content source corresponding to the respective thumbnail 504.

At block 1306, the media message engine 108 may receive one or more such inputs via one or more of the thumbnails 504. For example, upon viewing the thumbnails 504 provided in the second portion 408 of the display 402, the user 116 may provide a touch input at a location of a particular one of the thumbnails 504 indicating selection of the digital content source corresponding to the respective one of the thumbnails 504. The media message engine 108 may receive such an input via the display 402 at block 1306.

At block 1308, the media message engine 108 may cause the display 402 to display and/or otherwise provide one or more images 602 corresponding to a respective digital content segment of a plurality of digital content segments 112 stored in either the memory 304 and/or the memory 204 of the server 102. For example, at block 1308 the content display module 308 may cause a plurality of images 602 to be displayed on the display 402 in response to the input received at block 1306. For example, receiving a touch input via the thumbnail 504(2) associated with a video library of the electronic device 104 may cause the content display module 308 to display a plurality of images 602, and each of the displayed images 602 may be representative of a respective digital video segment 112 stored in either the memory 304 and/or the memory 204 of the server 102. In another example embodiment, receiving a touch input via the thumbnail 504(N) associated with a camera roll of the electronic device 104 may cause the content display module 308 to display a plurality of images 602, and each of the displayed images 602 may be representative of a respective image or other digital content segment 112 stored in either the memory 304 and/or the memory 204 of the server 102.

At block 1310 the media message engine 108 may receive one or more additional inputs via one or more of the images 602. For example, upon viewing the images 602 provided at block 1308, the user 116 may provide a touch input at a location of a particular one of the images 602 indicating selection of a digital content segment 112 corresponding to the respective one of the images 602. The media message engine 108 may receive such an input via the display 402 at block 1310. Further, at block 1310 the media message engine 108 may receive one or more additional inputs via the display 402, and each of the additional inputs may indicate selection of respective additional digital content segments 112 corresponding to the various images 602 displayed at the second portion 408. In this way, the user 116 may select a plurality of digital content segments 112 for inclusion in the digital media message 114 by selecting corresponding ones of the plurality of images 602. Additionally, as described above, various different components of the electronic device 104 may be utilized to capture the various digital content segments 112 described above. In some examples, a first component, such as a video camera and/or other user interface device 314 of the electronic device 104 may be employed to capture, for example, a digital video segment at block 1302. In such embodiments, a second component of the electronic device 104 different from the first component, such as a camera, microphone, and/or other user interface device 314 may be employed to capture for example, a digital image or other such digital content segment 112 at block 1302 and/or at other times during an example method of generating a digital media message 114.

At block 1312 the media message engine 108 may receive one or more additional inputs via the electronic device 104. For example, upon selecting one or more digital content segments 112 at block 1310, the user 116 may provide a touch input via one or more controls 706 of the user interface 700 indicating a desire to transition into a next phase of digital media message generation. In response, the media message engine 108 may provide, for example, the user interface 800 configured to enable the user 116 to add and/or otherwise associate various selected digital content segments 112 to a play sequence of a digital media message 114. For example, as described above with respect to FIG. 8 the media message engine 108 may receive one or more touch inputs via a location on the first portion 404 of the display 402. In response to such an input, the media message engine 108 may, at block 1314, add a first portion of the digital video segment received at block 1302 to the play sequence. In some examples, adding and/or otherwise associating the selected digital content segments 112 with the play sequence at bock 1314 may include generating one or more combined message segments as described above.

In some examples, the media message engine 108 may also provide visual indicia of the play sequence of the digital media message 114 as the digital media message 114 is being created. For example, at block 1314, the content display module 308 may cause the display 402 to display a progress bar 426. As described above, the progress bar 426 may include a plurality of discrete portions 812, and each portion 812 of the progress bar 426 may correspond to and/or may otherwise be indicative of at least one respective digital content segment 112 included at the location in the play sequence of the digital media message 114 corresponding to the portion 812. For example, a first portion 812(1) of the progress bar 426 may correspond to and/or may otherwise be indicative of the first portion of the digital video segment that is added to the play sequence of the digital media message 114 at block 1314. In example embodiments, the first portion of the digital video segment added to the play sequence at block 1314 may include both audio and video from the digital video segment received at block 1302.

As noted herein, a touch and hold input provided at the first portion 404 of the display 402 may cause the media message engine 108 to add the first portion of the digital video segment, received at block 1302, to the play sequence at block 1314. Alternatively, touch and hold inputs received at other portions of the display 402, such as via the second portion 408, may cause the media message engine 108 to add other digital content segments 112 to the play sequence. For example, touch and hold inputs received at a location in the second portion 408 displaying one or more of the selected images 602 may cause the media message engine 108 to add a digital content segment 112 corresponding to the image 602 displayed at the location of such a touch and hold input. In such examples, the media message engine 108 may add the image 602 displayed at the location of such a touch and hold input to the play sequence such that a digital content segment 112 corresponding to such an image 602 will be provided simultaneously with at least part of a second portion of the digital video segment received at block 1302.

For example, at block 1316 the media message engine 108 may receive one or more touch inputs via a location on the second portion 408 of the display 402. Such inputs are described above with respect to, for example, FIG. 9. In response to such an inputs, the media message engine 108 may, at block 1318, add the selected digital content segment 112 to the play sequence of the digital media message 114 in combination with a second portion of the digital video segment received at block 1302. In some examples, adding and/or otherwise associating the selected digital content segments 112 with the play sequence of at bock 1318 may include generating one or more combined message segments. For example, adding the selected digital content segment 112 in response to the input received at block 1316 may cause the selected digital content segment 112 to be provided simultaneously with at least part of a second portion of the digital video segment received at block 1302. In such embodiments, the selected digital content segment 112 may be merged with the part of the second portion of the digital video segment in order to form such a combined message segment. In such examples, the combined message segment may include, among other things, the selected digital content segment 112 (e.g., a digital image) as well as at least part of the second portion of the digital video segment (e.g., audio from the second portion of the digital video segment). In such examples, the digital image of the selected digital content segment 112 may be displayed simultaneously with audio from the second portion of the digital video segment when the combined message segment is played. In particular, at block 1318 the media message engine 108 may replace, for example, video and/or images of the second portion of the digital video segment with a digital image of the selected digital content segment 112.

In example embodiments, the processes described with respect to one or more of blocks 1312-1318 may be repeated numerous times until generation of the digital media message 114 has been completed. Additionally, upon completion of the digital media message 114 the media message engine 108 may receive an additional input via, for example, the display 402. In response to such an additional input, the media message engine 108 may direct the digital media message 114, via the electronic device 104, to a network 106 such that the digital media message 114 may be transferred over the network 106 in at least one of a text message, an email, a website, or other such portal. In this way, the digital media message 114 may be received by a remote electronic device 118, and may be consumed on the remote electronic device 118 by one or more additional users 120. In such embodiments, the digital media message 114 may include at least the combined segment described above.

In summary, example embodiments of the present disclosure provide devices and methods for generating digital media messages as a means for communication between users in remote locations. Such digital media messages include various combinations of audio, video, images, photos, and/or other digital content segments, and can be quickly and artfully created by each user with little effort. For example, the user may combine a wide variety, and a large number, of different digital content segments into a single digital media message. The methods of generating such a digital media message described herein enable the user to utilize a wide array of audio, video, and/or photo editing controls to quickly and easily modify each individual content segment, or combinations thereof. As a result, such methods provide the user with great artistic freedom in creating the digital media message. Additionally, the methods described herein may be performed using a minimum number of gestures or other such inputs. As a result, such methods enable the user to generate content-rich digital media messages 114 relatively quickly, thereby facilitating the use of such digital media messages as an efficient means of communication.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method of generating a digital media message, executed on an electronic device, comprising:

receiving a digital video segment with the electronic device, wherein the electronic device includes at least one processor;

providing a plurality of images via a display of the electronic device, each image of the plurality of images being indicative of a respective digital content segment different from the digital video segment;

receiving, via the electronic device, a first input indicating selection of a first digital content segment associated with a corresponding image of the plurality of images;

associating the digital video segment and the first digital content segment with a play sequence of the digital media message such that the first digital content segment will be presented simultaneously with at least part of the digital video segment when the digital media message is played, wherein associating the digital video segment and the first digital content segment with the play sequence comprises replacing a plurality of frames of the digital video segment with a single frame corresponding to an image of the first digital content segment; and providing the digital media message for sharing with a remote electronic device, wherein the digital media message comprises at least the digital video segment and the first, digital content segment.

2. The method of claim 1, further comprising:

providing a plurality of thumbnails via the display, each thumbnail of the plurality of thumbnails being representative of a respective digital content source, and the first digital content segment being received from one of the respective digital content sources;

receiving, via the electronic device, a second input indicating selection of a first thumbnail of the plurality of thumbnails corresponding to the one of the respective sources; and providing the plurality of images at least partly in response to the second input.

3. The method of claim 2, further comprising providing visual indicia identifying the one of the respective sources, via the display, at least partly in response to the second input, the visual indicia being displayed simultaneously with the plurality of images.

4. The method of claim 1, further comprising providing a progress bar via the display, the progress bar including a portion having a length that changes, in real time, as the digital video segment is captured.

5. The method of claim 1, wherein associating the digital video segment and the first digital content segment with the play sequence comprises replacing at least one of video or an image of a portion of the digital video segment with an image of the first digital content segment.

6. The method of claim 1, further comprising:

receiving a second input via the electronic device;

adding a first portion of the digital video segment to the play sequence at a first location at least partly in response to the second input;

receiving a third input via the electronic device; and adding the first digital content segment to the play sequence, at a second location after the first location, at least partly in response to the third input.

7. The method of claim 6, further comprising:

playing the first portion of the digital video segment via the display at least partly in response to the second input; and providing the image corresponding to the first digital content segment via the display while the first portion of the digital video segment is playing such that the image and the first portion are visible simultaneously.

8. The method of claim 6, further comprising adding, at least partly in response to the third input, at least part of a second portion of the digital video segment different from the first portion of the digital video segment to the play sequence at the second location.

9. The method of claim 8, wherein the part of the second portion of the digital video segment comprises audio of the second portion.

10. The method of claim 6, wherein the digital content segment comprises a particular image, and wherein the particular image is added to the play sequence at the second location such that when the digital media message is played, the particular image is displayed while audio of the digital video segment is provided.

11. The method of claim 6, further comprising providing a progress bar via the display, wherein the progress bar comprises first visual indicia of the first location, second visual indicia of the second location separate from the first visual indicia, and a movable marker.

12. The method of claim 11, wherein the first visual indicia of the first location is provided at least partly in response to the second input, and the second visual indicia of the second location is provided at least partly in response to the third input.

13. The method of claim 6, wherein the second input comprises a first touch and hold input received at a location on the display at which the digital video segment is provided, and the third input comprises a second touch and hold input received at a location on the display at which the image corresponding to the first digital content segment is provided.

14. One or more computer readable media storing computer-executable instructions that, when executed, cause one or more processors of an electronic device to perform acts comprising:

causing a digital video segment to be captured by a first component of the electronic device;

causing the digital video segment to be stored in memory accessible by the device;

receiving a first input indicating selection of a digital content source;

causing a plurality of images to be displayed on a display of the electronic device in response to the first input, wherein each image of the plurality of images corresponds to a respective digital content segment of a plurality of digital content segments stored in either the one or more computer readable media or in additional memory;

receiving a second input via the display indicating selection of a first digital content segment of the plurality of digital content segments, wherein the first digital content segment was captured by a second component of the electronic device different from the first component;

receiving a third input at a first location on the display;

adding a first portion of the digital video segment to a play sequence of a digital media message in response to the third input;

receiving a fourth input at a second location on the display different from the first location on the display; and adding the first digital content segment to the play sequence in response to the fourth input such that the first digital content segment will be provided simultaneously with at least part of a second portion of the digital video segment different from the first portion when the digital media message is played, wherein adding the first digital content segment to the play sequence in response to the fourth input comprises replacing a plurality of frames of the second portion of the digital video segment with a single frame corresponding to an image of the first digital content segment.

15. The computer-readable media of claim 14, the acts further comprising providing, via the electronic device, a plurality of controls operable to modify at least one of the digital video segment or the first digital content segment.

16. The computer-readable media of claim 14, the acts further comprising directing the digital media message, via the electronic device, to a network such that the digital media message can be transferred over the network in at least one of a text message, an email, or a website.

17. The computer-readable media of claim 14, the acts further comprising: causing the first portion of the digital video segment to be played via the display at least partly in response to the third input; and causing an image of the plurality of images corresponding to the first digital content segment to be displayed via the display while the first portion of the digital video segment is playing such that the image and the first portion are visible simultaneously.

18. The computer-readable media of claim 14, wherein the first digital content segment comprises a particular image, the acts further comprising adding the particular image to the play sequence at the second location such that when the digital media message is played, the particular image is displayed while audio of the second portion of the digital video segment is provided.

19. The computer-readable media of claim 14, wherein the first and second inputs comprises respective touch inputs received via the display, and the third and fourth inputs comprise respective touch and hold inputs received via the display.

20. The computer-readable media of claim 14, the acts further comprising causing a progress bar associated with the play sequence to be provided via the display, the progress bar comprising a first visual indicia indicative of a length of time during which the first portion of the digital video segment will be provided when the digital media message is played, and a second visual indicia separate from the first visual indicia indicative of a length of time during which the first digital content segment will be provided when the digital media message is played.

21. An electronic device, comprising:
a display;
a processor; and
memory connected to the processor, the memory storing instructions that, when executed by the processor, cause the processor to perform one or more acts including:
causing a digital video segment to be captured by a video camera of the electronic device;
receiving a first input indicating selection of a digital content source;
causing a plurality of images to be displayed on the display in response to the first input, wherein each image of the plurality of images corresponds to a respective digital content segment of a plurality of digital content segments stored in the memory;
receiving a second input via the display indicating selection of a first digital content segment of the plurality of digital content segments, wherein the first digital content segment was captured by a component of the electronic device other than the video camera;
adding a first portion of the digital video segment to a play sequence of a digital media message in response to a third input; and
adding the first digital content segment to the play sequence in response to a fourth input such that the first digital content segment will be provided simultaneously with at least part of a second portion of the digital video segment different from the first portion when the digital media message is played, wherein adding the first digital content segment to the play sequence in response to the fourth input comprises replacing a plurality of frames of the second portion of the digital video segment with a single frame of an image of the first digital content segment.

22. The electronic device of claim 21, wherein the first digital content segment comprises one of a photo, an audio segment, or a video segment.

23. The electronic device of claim 21, the acts further comprising causing a plurality of controls to be provided via the display, at least one control of the plurality of controls being configured to modify at least one of the digital video segment or the first digital content segment when active.

24. The electronic device of claim 21, wherein adding the first digital content segment to the play sequence in response to the fourth input comprises replacing at least one of video or an image of the second portion of the digital video segment with an image of the first digital content segment.

* * * * *